US012654351B2

(12) United States Patent
Werbach et al.

(10) Patent No.: US 12,654,351 B2
(45) Date of Patent: Jun. 16, 2026

(54) CIRCULAR SAWS THAT INCLUDE BLADE MOUNTS FOR CIRCULAR SAW BLADES AND METHODS OF ATTACHING CIRCULAR SAW BLADES TO CIRCULAR SAWS

(71) Applicant: Festool GmbH, Wendlingen am Neckar (DE)

(72) Inventors: Martin Werbach, Stuttgart (DE); Tobias Hoefer, Urbach (DE)

(73) Assignee: Festool GmbH, Wendlingen am Neckar (DE)

( * ) Notice: Subject to any disclaimer, the term of this patent is extended or adjusted under 35 U.S.C. 154(b) by 218 days.

(21) Appl. No.: 17/919,568

(22) PCT Filed: Jun. 23, 2021

(86) PCT No.: PCT/EP2021/067116

§ 371 (c)(1),
(2) Date: Oct. 18, 2022

(87) PCT Pub. No.: WO2021/259983

PCT Pub. Date: Dec. 30, 2021

(65) Prior Publication Data

US 2023/0166424 A1 Jun. 1, 2023

Related U.S. Application Data

(60) Provisional application No. 63/044,034, filed on Jun. 25, 2020.

(51) Int. Cl.
*B27B 5/32* (2006.01)
*B27B 5/30* (2006.01)

(52) U.S. Cl.
CPC . *B27B 5/32* (2013.01); *B27B 5/30* (2013.01)

(58) Field of Classification Search
CPC .......... B27B 5/32; B27B 5/30; Y10T 83/9379
(Continued)

(56) References Cited

U.S. PATENT DOCUMENTS 4,729,193 A * 3/1988 Gant ..................... B24B 45/006 409/231
5,303,688 A * 4/1994 Chiuminatta ........ B23D 61/025 83/676

(Continued)

FOREIGN PATENT DOCUMENTS

CN 1623726 A 6/2005
CN 102161119 A 8/2011

(Continued)

OTHER PUBLICATIONS

Saiper 12pcs/2Sets HSS Circular Wood Cutting Saw Blade Discs with 2pcs ⅛" Shank Extension Rod for Dremel Rotary Tool Mandrel; obtained from www.amazon.com on Jan. 27, 2025 (Year: 2018).*

(Continued)

*Primary Examiner* — Evan H Macfarlane
(74) *Attorney, Agent, or Firm* — Lucian Wayne Beavers; Patterson Intellectual Property Law, PC

(57) ABSTRACT

Circular saws include blade mounts for circular saw blades and methods of attaching circular saw blades to circular saws. The circular saws include a motor, an arbor, and a blade mount. The motor includes a motor shaft configured to rotate about a shaft rotational axis. The arbor is configured to receive a torque from the motor when the motor shaft rotates about the shaft rotational axis. The blade mount is operatively attached to the arbor and is configured to selectively and operatively attach a circular saw blade to the arbor. The blade mount includes an inner flange that includes an inner flange blade-contacting surface that faces away from the motor. The inner flange is free from any structure
(Continued)

that projects away from the motor and also away from the inner flange blade-contacting surface.

6 Claims, 17 Drawing Sheets

(58) Field of Classification Search
USPC ........................................................... 83/666
See application file for complete search history.

(56) References Cited

U.S. PATENT DOCUMENTS

| | | | | |
|---|---|---|---|---|
| 5,406,752 | A | 4/1995 | Neff | |
| 5,423,358 | A * | 6/1995 | Rautio | B23D 61/025 144/41 |
| 5,718,621 | A * | 2/1998 | Turley | B24B 23/022 451/342 |
| 6,093,090 | A * | 7/2000 | Tosto | B24B 23/02 451/352 |
| 6,561,063 | B1 * | 5/2003 | Mulford | B24B 55/052 451/354 |
| 6,802,764 | B2 * | 10/2004 | Besch | B26B 7/00 30/340 |
| 6,905,401 | B1 * | 6/2005 | Chen | B24B 23/026 451/342 |
| 8,776,657 | B2 | 7/2014 | Menze | |
| 11,014,260 | B2 | 5/2021 | Zinge | |
| 2003/0121160 | A1 * | 7/2003 | Chang | B23Q 17/24 30/391 |
| 2006/0185492 | A1 | 8/2006 | Chianese | |
| 2010/0197208 | A1 | 8/2010 | Blickle et al. | |
| 2011/0179931 | A1 | 7/2011 | Menze | |
| 2018/0036900 | A1 * | 2/2018 | Cuzdey | B23D 61/025 |

FOREIGN PATENT DOCUMENTS

| | | | |
|---|---|---|---|
| CN | 203650629 | U | 6/2014 |
| CN | 206445286 | U | 8/2017 |
| CN | 110919082 | A | 3/2020 |
| CN | 111225775 | A | 6/2020 |
| DE | 3621718 | A1 | 1/1988 |
| GB | 2408709 | A | 6/2005 |
| JP | 11977139483 | A | 10/1977 |
| JP | 08177813 | A | 7/1996 |
| WO | 9938652 | A1 | 8/1999 |
| WO | 2018229563 | A1 | 12/2018 |

OTHER PUBLICATIONS

Office Action for corresponding Japan 221189P, dated Dec. 19, 2023, 2 pages (not prior art).
Translation of Office Action for corresponding JP221189P, dated Dec. 19, 2023, 3 pages (not prior art).
China Office Action for corresponding patent application No. 2023083001885360, dated Aug. 30, 2023, 8 pages (not prior art).
The International Search Report dated Sep. 8, 2021 from the corresponding PCT/EP2021/067116 (not prior art).
China Office Action for corresponding patent application No. 2024091002223770, dated Sep. 10, 2024, 8 pages (not prior art).

* cited by examiner

CIRCULAR SAWS THAT INCLUDE BLADE MOUNTS FOR CIRCULAR SAW BLADES AND METHODS OF ATTACHING CIRCULAR SAW BLADES TO CIRCULAR SAWS

RELATED APPLICATION

This application claims priority to U.S. Provisional Patent Application No. 63/044,034, which was filed on Jun. 25, 2020, and the complete disclosure of which is hereby incorporated by reference.

FIELD OF THE DISCLOSURE

The present disclosure is directed generally to circular saws that include blade mounts for circular saw blades and/or to methods of attaching circular saw blades to circular saws.

BACKGROUND OF THE DISCLOSURE

Circular saws utilize a rotating circular saw blade to cut a workpiece. The circular saw generally is configured such that the circular saw blade may be selectively attached to and separated from the circular saw, such as to permit sharpening of the circular saw blade, replacement of the circular saw blade, and/or operative attachment of application-specific circular saw blades to the circular saw. Clearances for the circular saw blade, within the circular saw, may be relatively tight. As such, it sometimes may be challenging to attach and/or to remove certain circular saw blades from certain circular saws utilizing conventional attachment mechanisms. Thus, there exists a need for improved circular saws that include blade mounts and/or for improved methods of attaching circular saw blades to circular saws.

SUMMARY OF THE DISCLOSURE

Circular saws that include blade mounts for circular saw blades and methods of attaching circular saw blades to circular saws are disclosed herein. The circular saws include a motor, an arbor, and a blade mount. The motor includes a motor shaft configured to rotate about a shaft rotational axis. The arbor is configured to receive a torque from the motor when the motor shaft rotates about the shaft rotational axis. The blade mount is operatively attached to the arbor and is configured to selectively and operatively attach a circular saw blade to the arbor. The blade mount includes an inner flange that includes an inner flange blade-contacting surface that faces away from the motor and is configured to contact the circular saw blade when the circular saw blade is selectively and operatively attached to the circular saw. The inner flange is free from any structure that projects away from the motor and also away from the inner flange blade-contacting surface.

The methods include operatively aligning a central opening of a circular saw blade with an inner flange of a circular saw such that an inner planar blade surface of the circular saw blade is in face-to-face contact with an inner flange blade-contacting surface of a blade mount of the inner flange. The operatively aligning also includes operatively aligning such that the central opening of the circular saw blade is free from any structure that projects from the inner flange. The methods also include positioning an outer flange of the blade mount such that an outer flange blade-contacting surface of the outer flange is in face-to-face contact with an outer planar blade surface of the circular saw blade and also such that an outer flange projecting region of the outer flange extends through the central opening of the circular saw blade and into an inner flange recessed region of the inner flange. The methods further include operatively retaining the outer flange on the arbor with a fastener.

DETAILED DESCRIPTION AND BEST MODE OF THE DISCLOSURE

Figure 1:
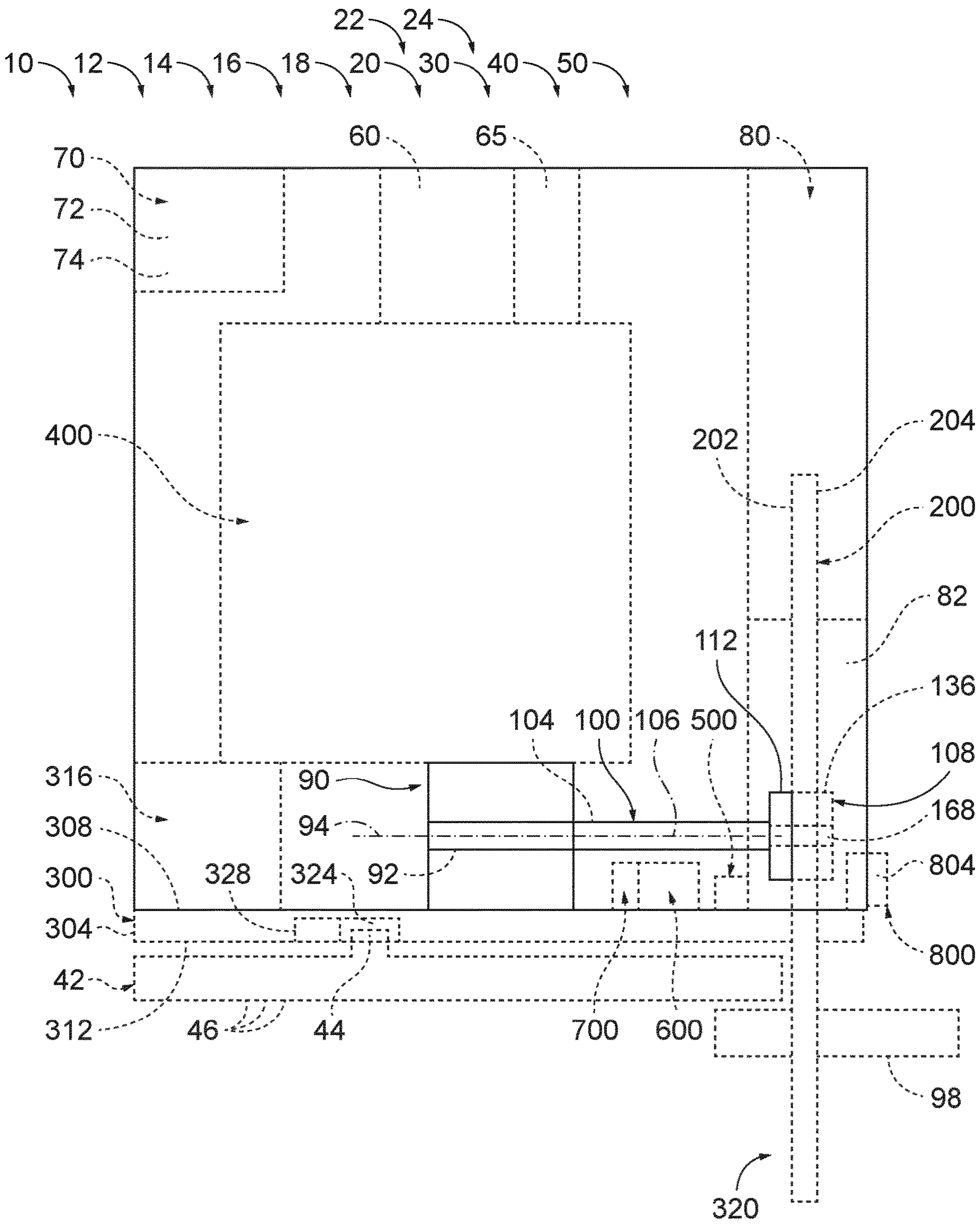
FIG. 1 is a schematic illustration of examples of a circular saw according to the present disclosure.

FIGS. 1-17 provide examples of circular saws 10 and/or of methods 1000, according to the present disclosure. Elements that serve a similar, or at least substantially similar, purpose are labeled with like numbers in each of FIGS. 1-17, and these elements may not be discussed in detail herein with reference to each of FIGS. 1-17. Similarly, all elements may not be labeled in each of FIGS. 1-17, but reference numerals associated therewith may be utilized herein for consistency. Elements, components, and/or features that are discussed herein with reference to one or more of FIGS. 1-17 may be included in and/or utilized with any of FIGS. 1-17 without departing from the scope of the present disclosure.

In general, elements that are likely to be included in a particular embodiment are illustrated in solid lines, while elements that are optional are illustrated in dashed lines. However, elements that are shown in solid lines may not be essential to all embodiments and, in some embodiments, may be omitted without departing from the scope of the present disclosure.

Figure 2:
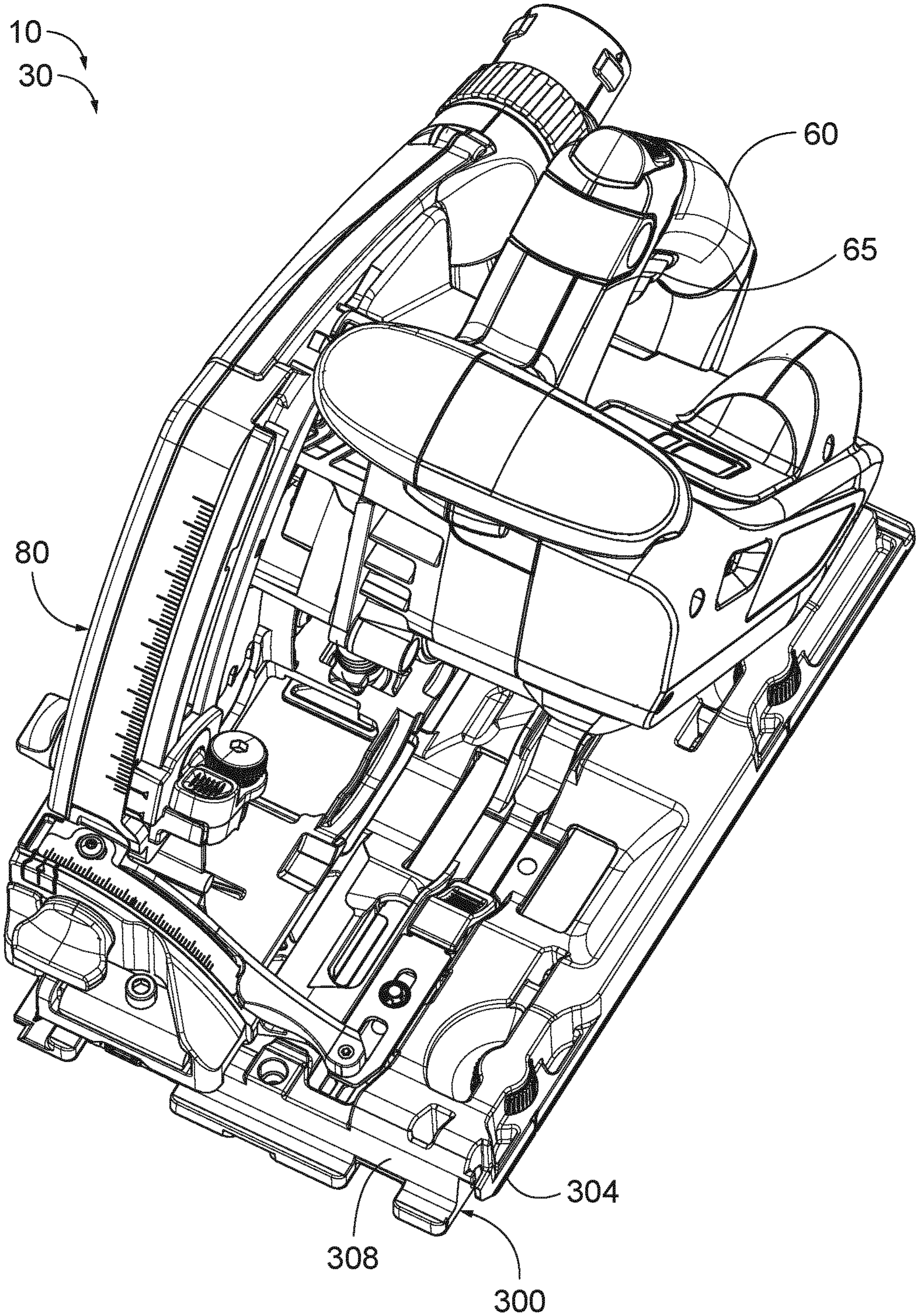
FIG. 2 is a less schematic top profile view of an example of a circular saw according to the present disclosure.
Figure 3:
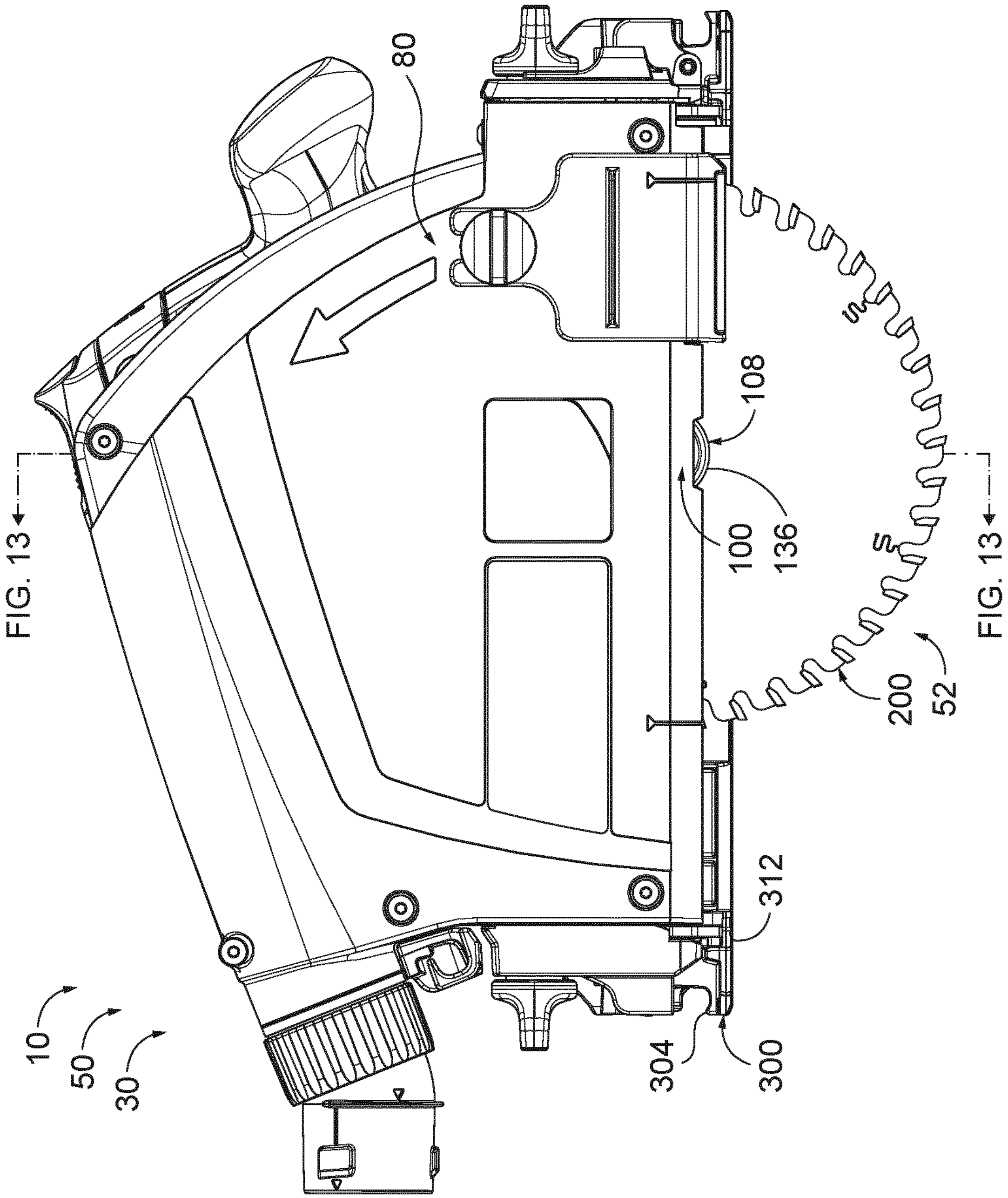
FIG. 3 is a less schematic right side view of an example of a circular saw according to the present disclosure.
Figure 4:
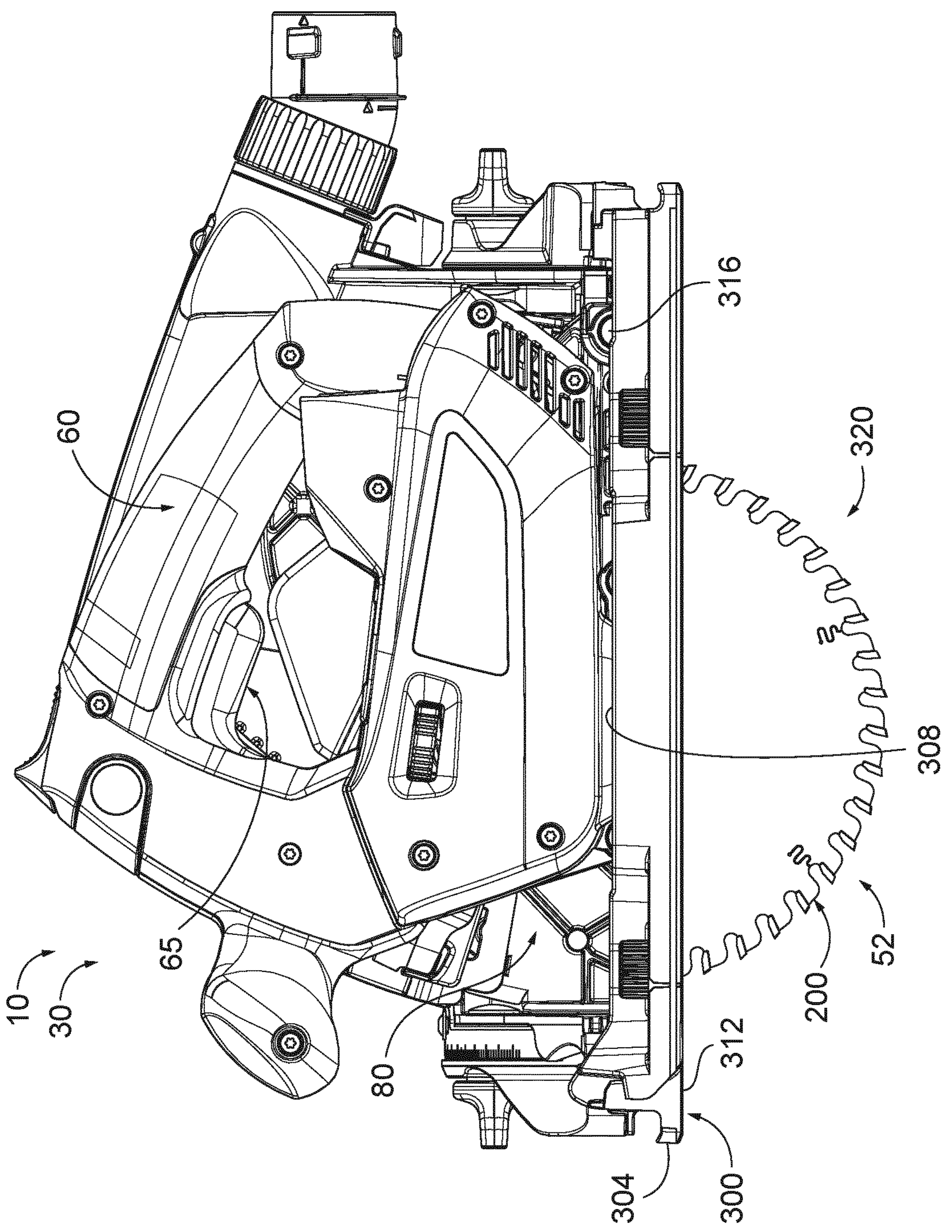
FIG. 4 is a less schematic left side view of an example of a circular saw according to the present disclosure.
Figure 5:
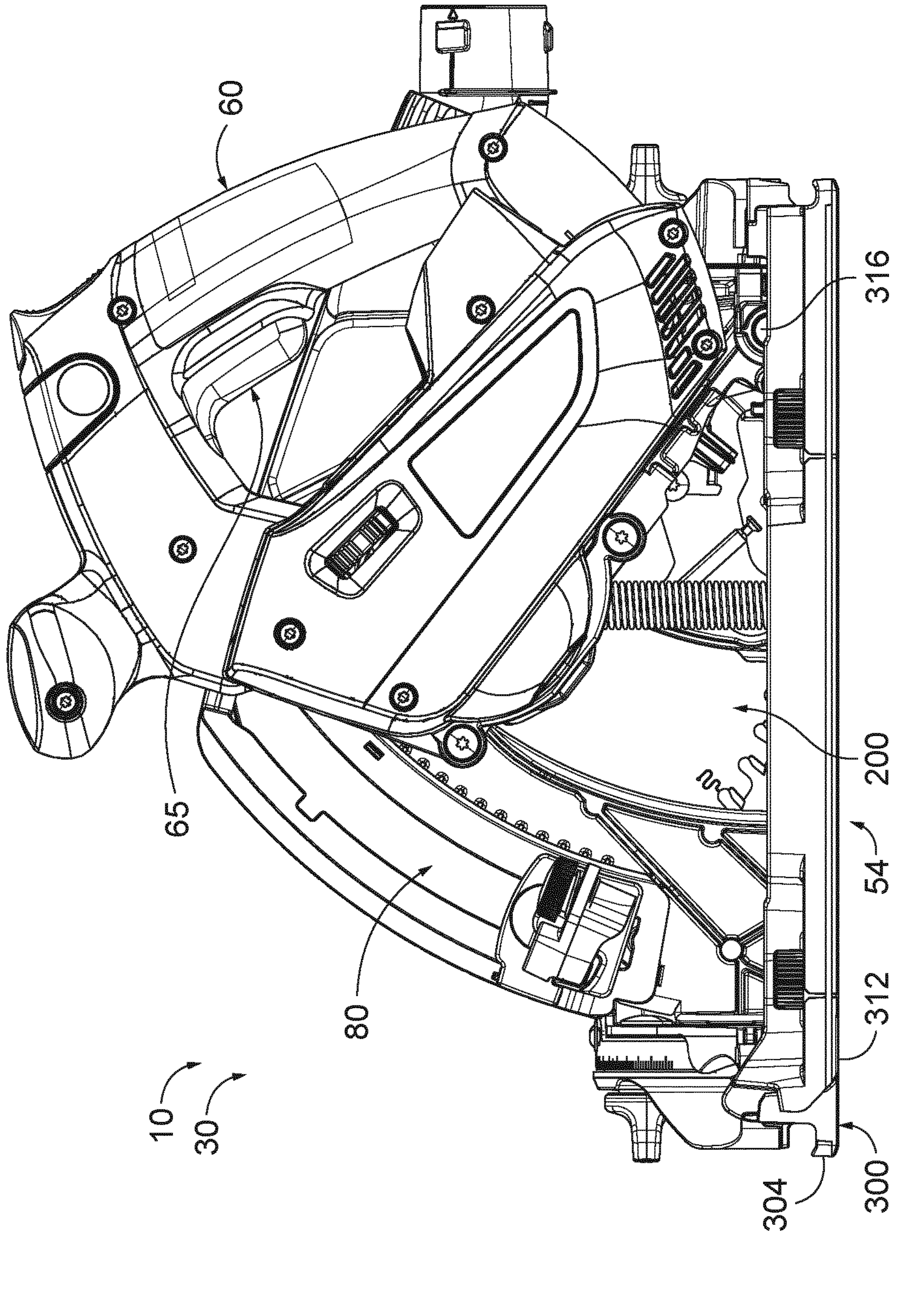
FIG. 5 is another less schematic left side view of an example of a circular saw according to the present disclosure.
Figure 6:
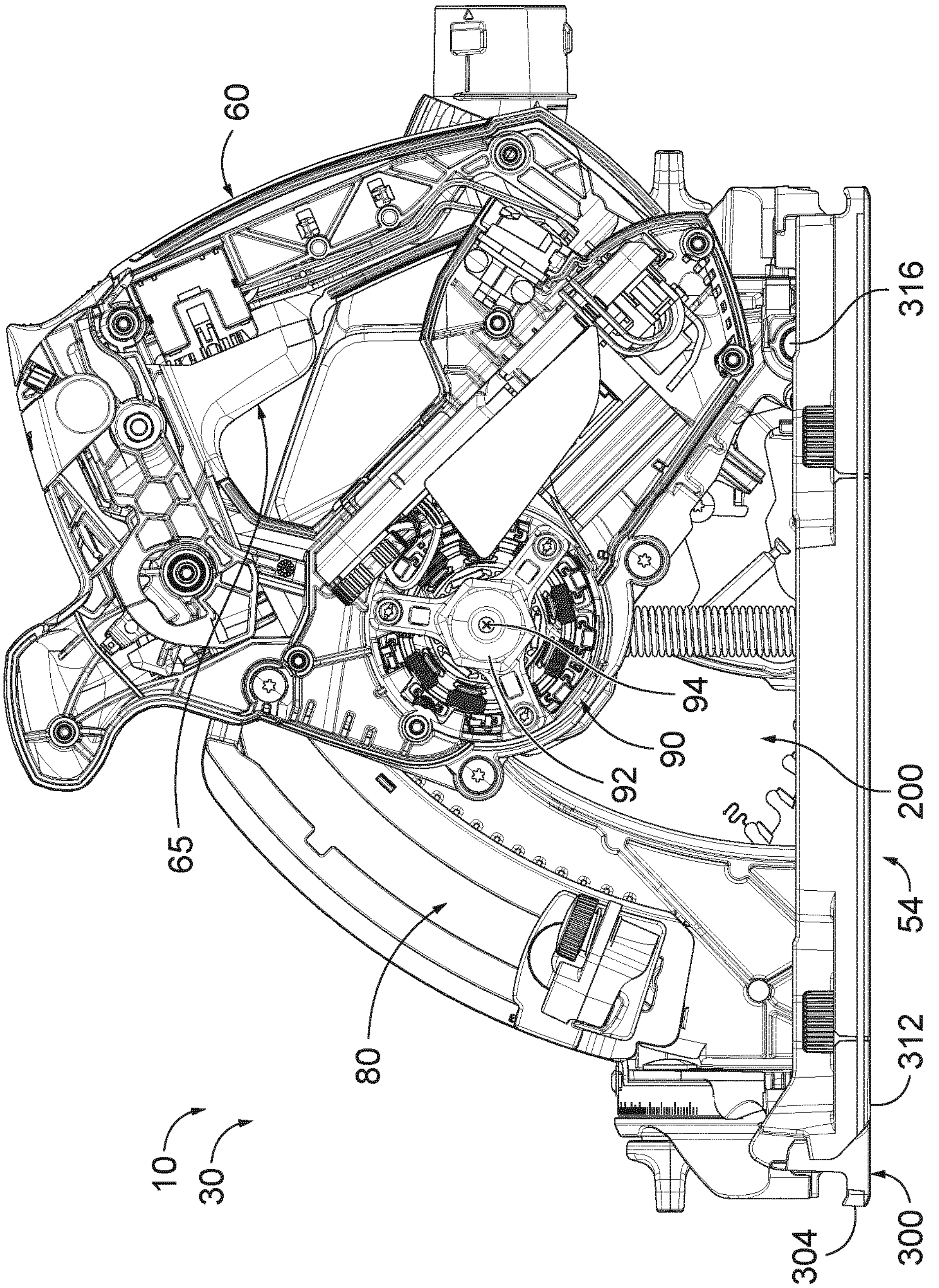
FIG. 6 is another less schematic left side view of an example of a circular saw according to the present disclosure.
Figure 7:
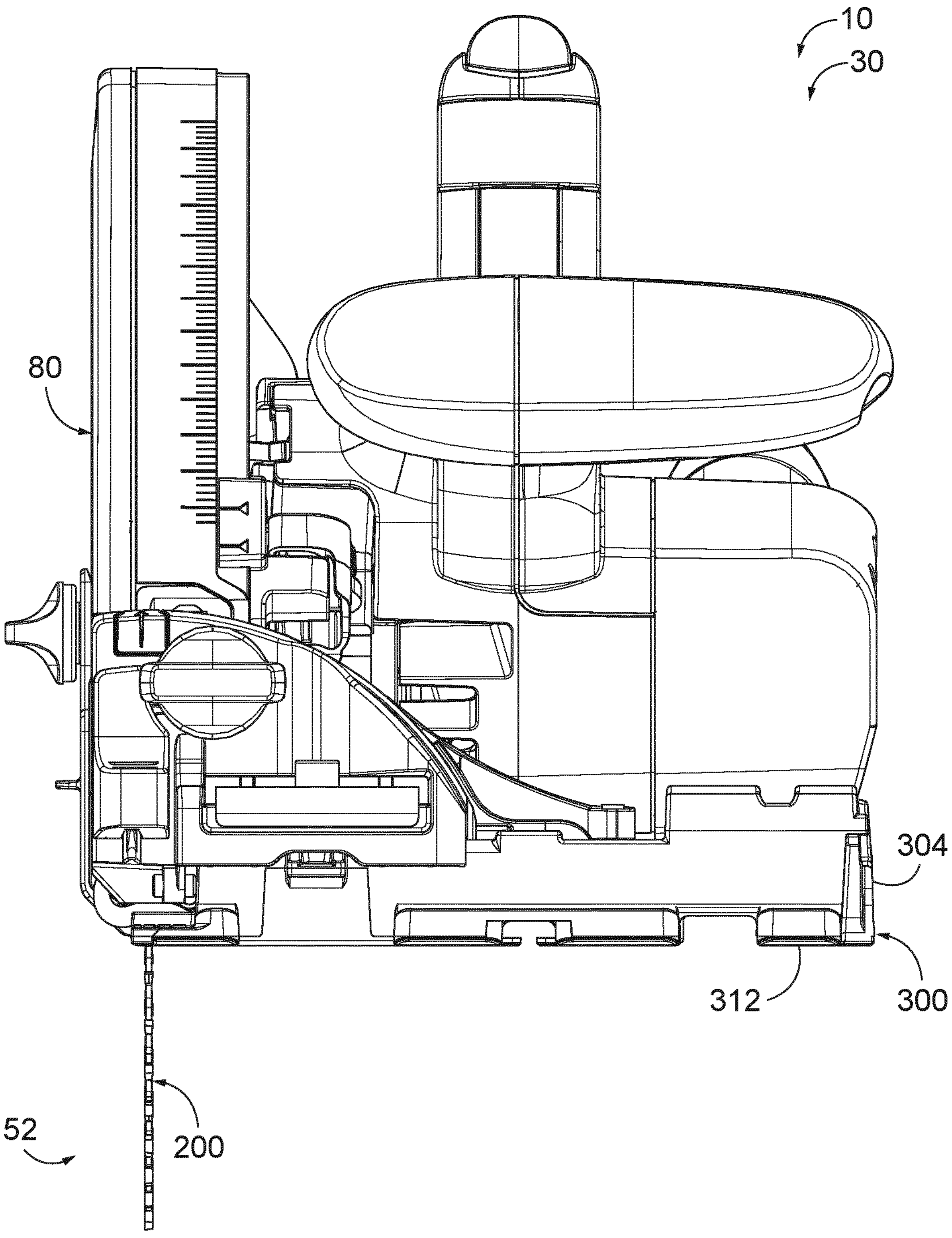
FIG. 7 is a less schematic front view of an example of a circular saw according to the present disclosure.
Figure 8:
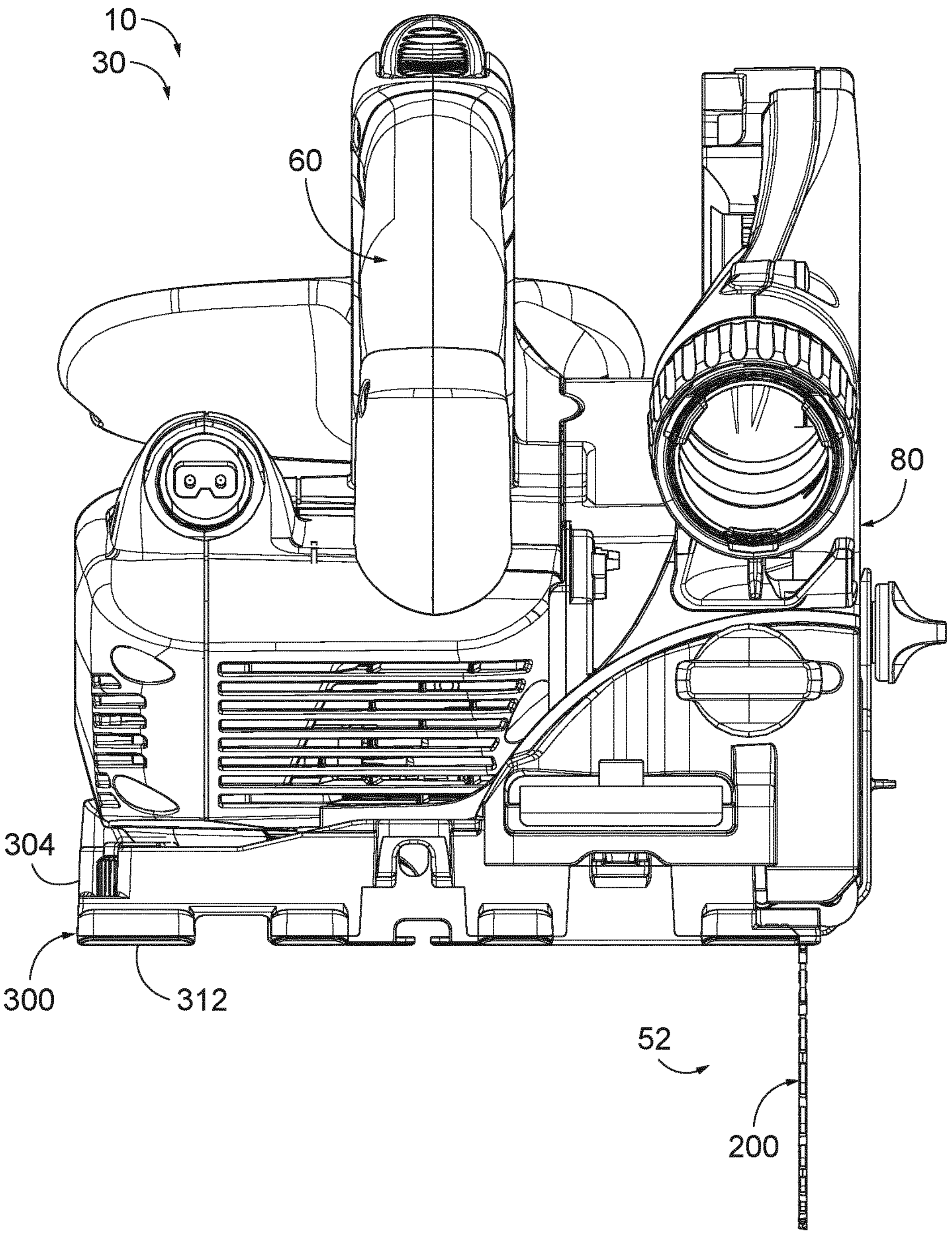
FIG. 8 is a less schematic rear view of an example of a circular saw according to the present disclosure.
Figure 9:
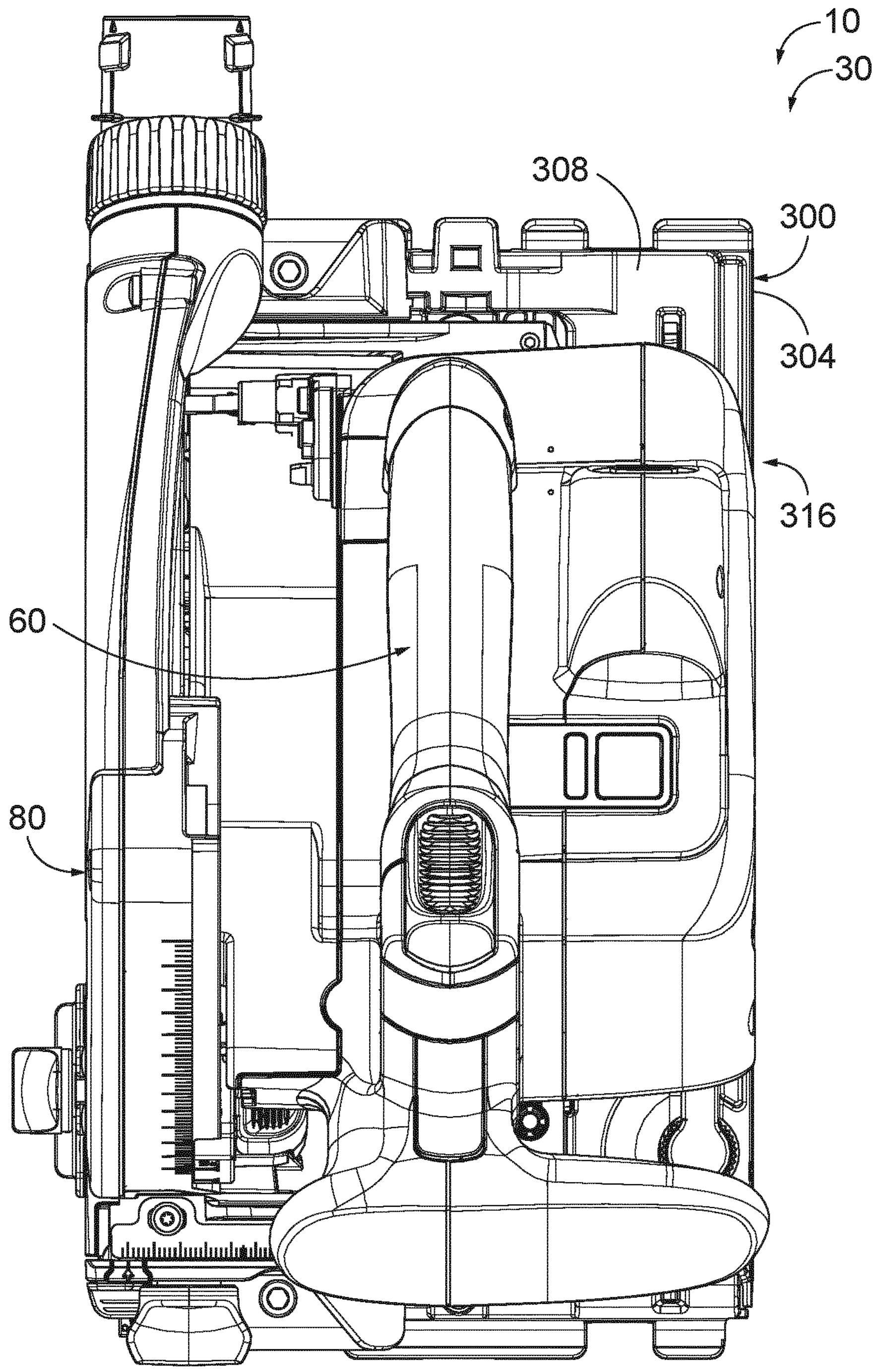
FIG. 9 is a less schematic top view of an example of a circular saw according to the present disclosure.
Figure 10:
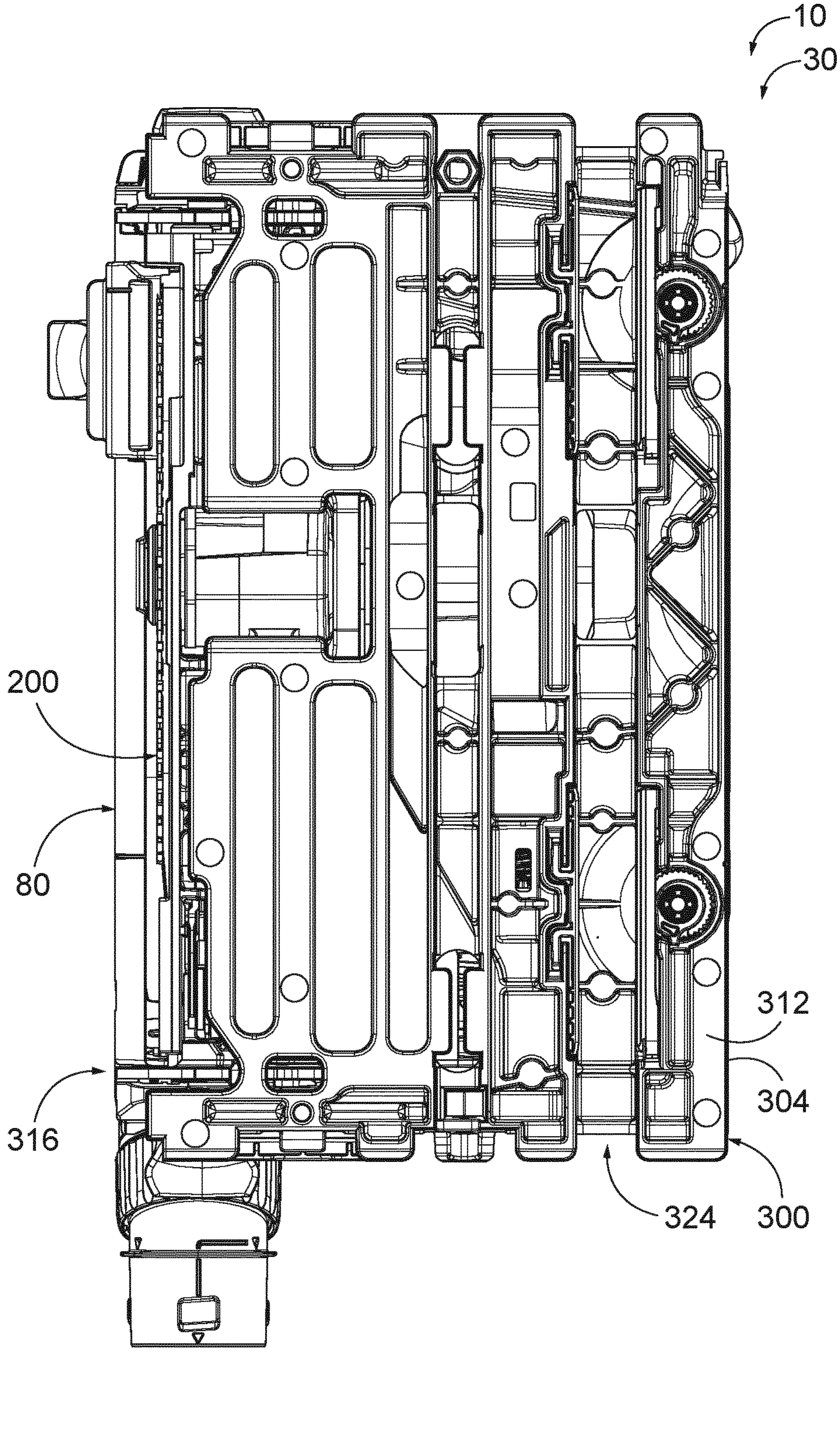
FIG. 10 is a less schematic bottom view of an example of a circular saw according to the present disclosure.

FIG. 1 is a schematic illustration of examples of circular saws 10 according to the present disclosure, while FIGS. 2-10 are less schematic illustrations of an example of a circular saw 10 according to the present disclosure, in the form of a plunge saw 30. More specifically, FIG. 2 illustrates a top profile view of circular saw 10, and FIG. 3 illustrates a right side view of circular saw 10. FIG. 4 illustrates a left side view of circular saw 10 illustrating the circular saw in a fully plunged orientation 52, FIG. 5 illustrates the left side view of circular saw 10 illustrating the circular saw in a fully retracted orientation 54, and FIG. 6 illustrates the left side view of FIG. 5 with several covers removed. FIG. 7 is a front view of circular saw 10, FIG. 8 is a rear view of circular saw 10, FIG. 9 is a top view of circular saw 10, and FIG. 10 is a bottom view of circular saw 10.

As illustrated collectively by FIGS. 1-10, circular saws 10 include a motor 90 that includes a motor shaft 92 configured to rotate about a shaft axis of rotation 94. Circular saws 10 also include an arbor 100 configured to receive a torque from motor 90 when motor shaft 92 rotates about the shaft rotational axis. As illustrated in dashed lines in FIG. 1 and in solid lines in FIGS. 3-8 and 10, circular saws 10 also may include a circular saw blade 200. Circular saw blade 200, when present, may be operatively attached to the circular saw via arbor 100 and/or may be configured for rotational movement with the arbor. Rotation of circular saw blade 200 may facilitate cutting of a workpiece 98 with the circular saw blade, as schematically illustrated in FIG. 1.

Circular saws 10 may include any suitable type or style of circular saw that is adapted, configured, designed, and/or constructed to utilize a circular saw blade 200 to cut the workpiece. Examples of circular saws 10 include a handheld circular saw 12, a miter saw 14, a radial arm saw 16, a table saw 18, a chop saw 20, an upcut saw 22, a panel saw 24, a plunge saw 30, a track saw 40, and/or a bevel saw 50, as schematically illustrated in FIG. 1. In some examples, circular saws 10 may include structures and/or features from two or more of the above saws, and/or may incorporate functionality of two or more of the above saws. As an example, and as discussed in more detail herein, a given circular saw 10 may be and/or may incorporate functionality of handheld circular saw 12, plunge saw 30, track saw 40, and/or bevel saw 50. Circular saws 10 according to the present disclosure thus may include one or more of the features disclosed herein, but circular saws 10 are not required to include all of the features disclosed herein.

Motor 90 may include any suitable structure that may provide the motive force for rotation of motor shaft 92 and/or for actuation of circular saw blade 200. Examples of motor 90 include an electric motor, an AC electric motor, a DC electric motor, a brushless DC motor, a variable-speed motor, and/or a single-speed motor.

As illustrated in dashed lines in FIG. 1 and in solid lines in FIGS. 2, 4-6, and 8-9, circular saws 10 may include a gripping region 60 that is configured to be gripped and/or held by a user during operation of the circular saw. Gripping region 60, when present, also may be referred to herein as and/or may be a handle, or hand grip.

As also illustrated in dashed lines in FIG. 1 and in solid lines in FIGS. 2 and 4-6, circular saws 10 may include at least one switch 65. Switch(es) 65, when present, may be configured to be selectively actuated by the user of the circular saw, such as to enable and/or permit electric current to be provided to at least one other component of the circular saw and/or to permit powered operation of the at least one other component of the circular saw. As examples, selective actuation of switch(es) 65 may be utilized to enable operation of a motor controller of the circular saw, to selectively apply an electric current to motor 90, to enable the motor controller to selectively apply the electric current to the motor, and/or to permit, or direct, the motor to provide the motive force for rotation of the motor shaft. In some examples, the electric current may be utilized to power, or to directly power, at least one other component of the circular saw, such as motor 90. In some such examples, the electric current also may be referred to herein as an electric power signal. In some examples, the electric current may be an electric data signal that is sent to at least one other component of the circular saw, such as the motor controller of the circular saw. In some such examples, the electric current also may be referred to herein as a data signal and/or as an electric data signal. Examples of switch 65 include an electrical switch, a normally open electrical switch, a momentary electrical switch, and/or a locking momentary electrical switch.

As also illustrated in dashed lines in FIG. 1 and in solid lines in FIGS. 2-10, circular saws 10 may include a workpiece support 300. Workpiece support 300, when present, may be configured to support workpiece 98 and/or to position the circular saw relative to the workpiece when the workpiece is cut or otherwise acted upon by the implement. For example, many circular saws 10 in the form of saws include workpiece support 300 in the form of a base plate, table, shoe, rack, or pad.

Circular saws 10 may include any suitable power source, and corresponding power structures, for powering motor 90. Examples of the power structures include a power supply structure 70, a power cord 72, and/or a battery 74, as illustrated in FIG. 1.

As also illustrated in dashed lines in FIG. 1 and in solid lines in FIGS. 2-10, circular saws 10 may include a blade guard 80. Blade guard 80, when present, may be configured to cover, to house, and/or to contain at least a region of circular saw blade 200, such as to prevent, or to decrease a potential for, contact between the user and the circular saw blade. In some examples of circular saws 10, blade guard 80 may include a retractable region 82, as illustrated in FIG. 1. The retractable region may be configured to fold, rotate, and/or otherwise retract when the circular saw is utilized to cut the workpiece. Retractable region 82 additionally or alternatively may be referred to as a retracting region 82 and/or a collapsing region 82.

In some examples, and as discussed, circular saws 10 may include and/or be plunge saw 30. In examples of circular saws 10 that are or include a plunge saw 30, arbor 100 may be configured to move relative to workpiece support 300, such as to selectively vary a region of circular saw blade 200 that projects from the workpiece support and/or to selectively vary a depth-of-cut of the circular saw. For example, arbor 100 may be configured to pivot relative to workpiece support 300, as illustrated by the transition between a fully plunged orientation 52, such as illustrated in FIGS. 3-4 and 7-8, and a fully retracted orientation 54, such as illustrated in FIGS. 5-6.

As a specific example, workpiece support 300 may include and/or be a base plate 304 that defines an arbor-facing side 308 and an arbor-opposed side 312. Arbor 100 may be operatively attached to arbor-facing side 308 of base plate 304 with, via, and/or utilizing a base plate pivot 316. In such examples, arbor 100 and base plate 304 may be configured to rotate, relative to one another, about base plate pivot 316, such as to selectively vary a region 320 of circular saw blade 200 that extends on arbor-opposed side 312 of the base plate, as perhaps best illustrated by the transition from the configuration that is illustrated in FIG. 4, which illustrates fully plunged orientation 52, to the configuration that is illustrated in FIG. 5, which illustrates fully retracted orientation 54.

Stated another way, arbor 100 may be configured to pivot relative to workpiece support 300 throughout a range of relative orientations, or relative angles, that may be bounded by the fully plunged orientation and the fully retracted orientation. For each relative orientation in this range of relative orientations, circular saw blade 200 may extend on arbor-opposed side 312 by a corresponding amount, thereby providing a corresponding maximum depth-of-cut for the circular saw.

In some examples, and as discussed, circular saws 10 may include and/or be track saw 40. In examples of circular saws 10 that are or include a track saw 40, base plate 304 may include a rib-receiving channel 324, which may be configured to receive a raised elongate rib 44 of a track 42, as perhaps best illustrated in FIG. 1. Track 42 also may be referred to herein as an elongate track 42 and may be formed from one or more elongate track segments, or track sections, 46, which may be operatively attached to one another to define any suitable track length. During operation of track saws 40, track 42 may be operatively attached, or clamped, to workpiece 98 such that an edge of the track corresponds to a desired cut line for the track saw. Subsequently, the track saw may be positioned, relative to the track, such that raised elongate rib 44 is positioned within rib-receiving channel 324; and the track saw then may be translated along at least a fraction of the length of the elongate track, thereby producing a straight cut along the desired cut line.

Figure 11:
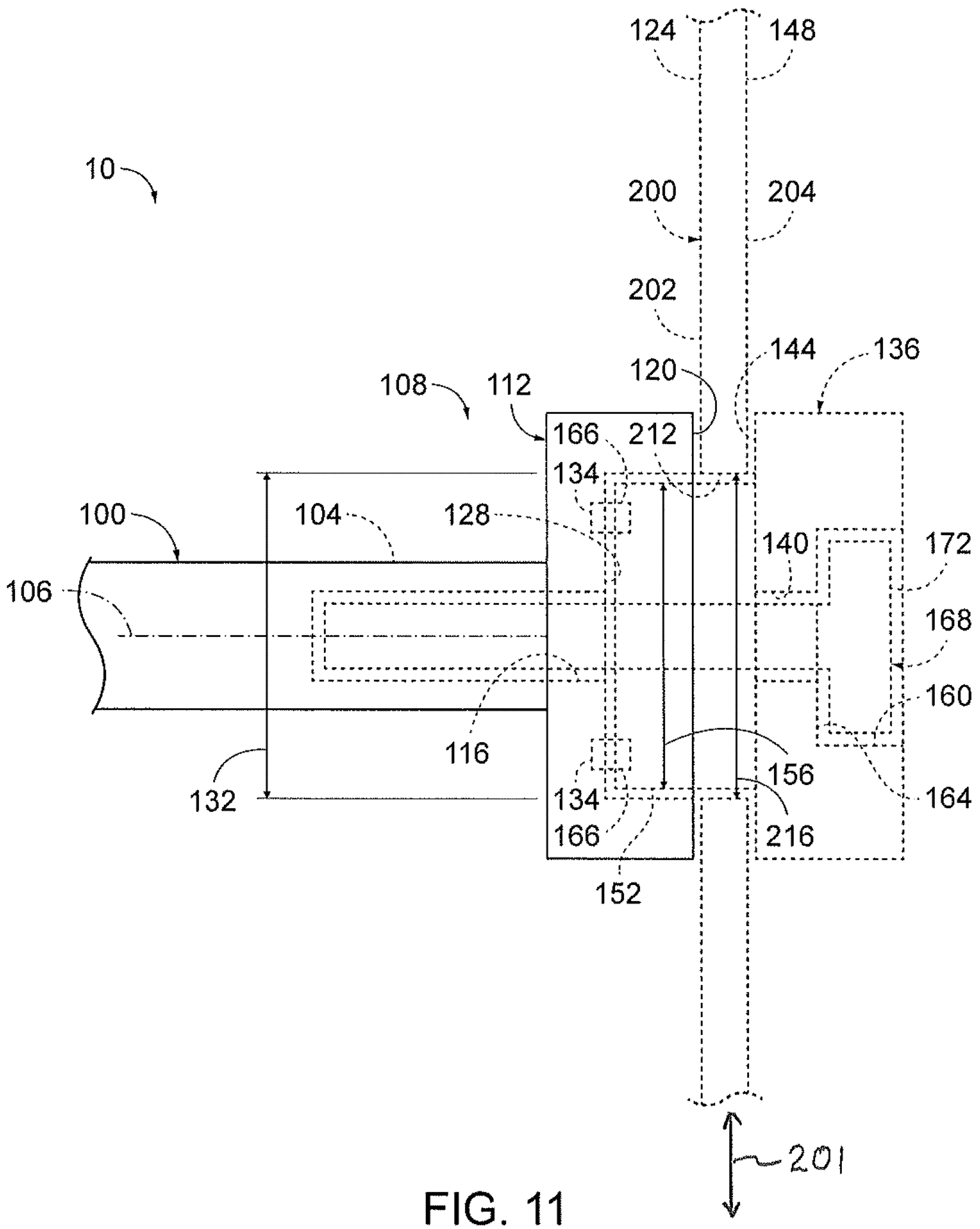
FIG. 11 is a schematic illustration of examples of an arbor, a blade mount, and a circular saw blade that may be utilized with circular saws, according to the present disclosure.
Figure 12:
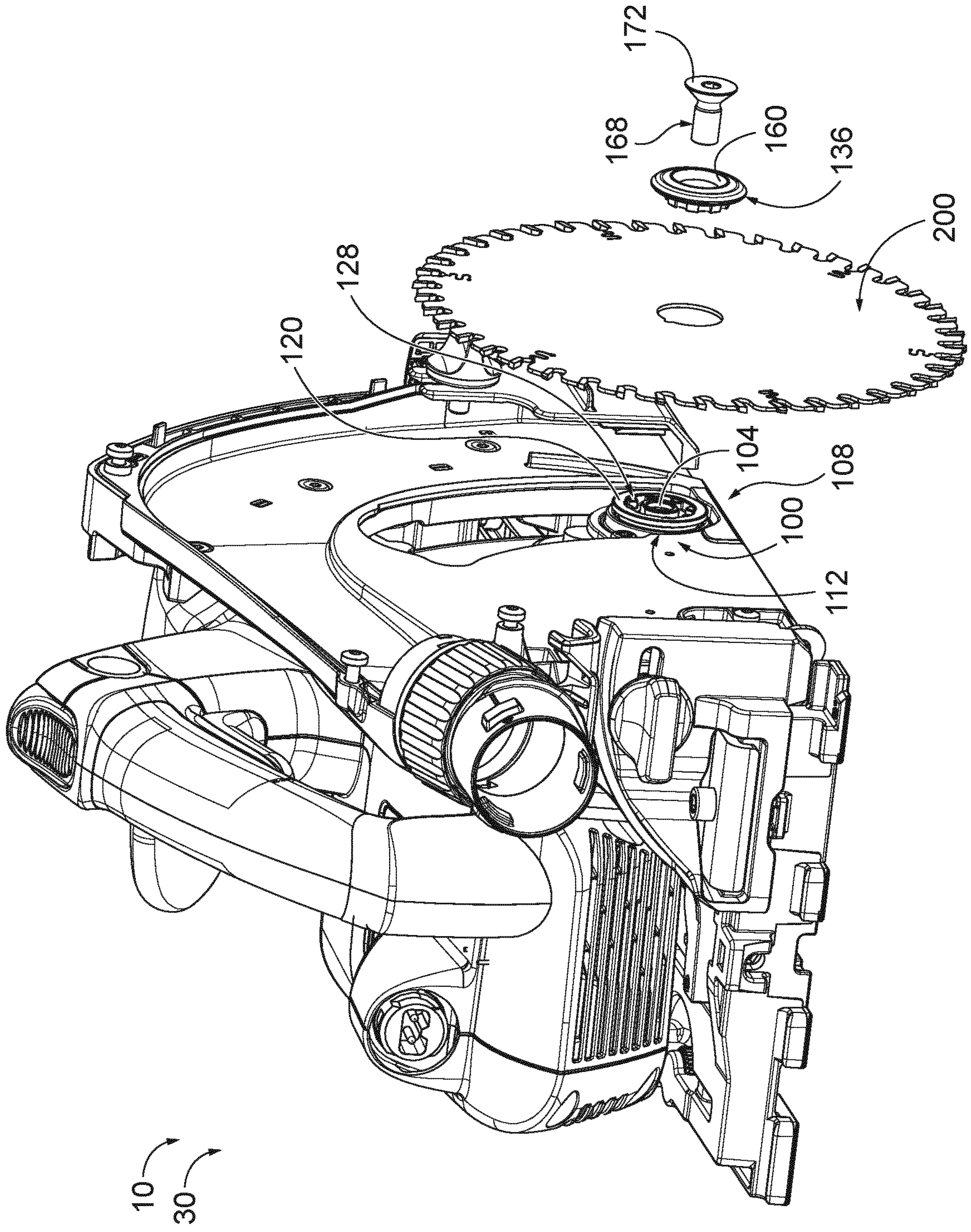
FIG. 12 is a partially exploded less schematic perspective view of an example of a circular saw according to the present disclosure.
Figure 13:
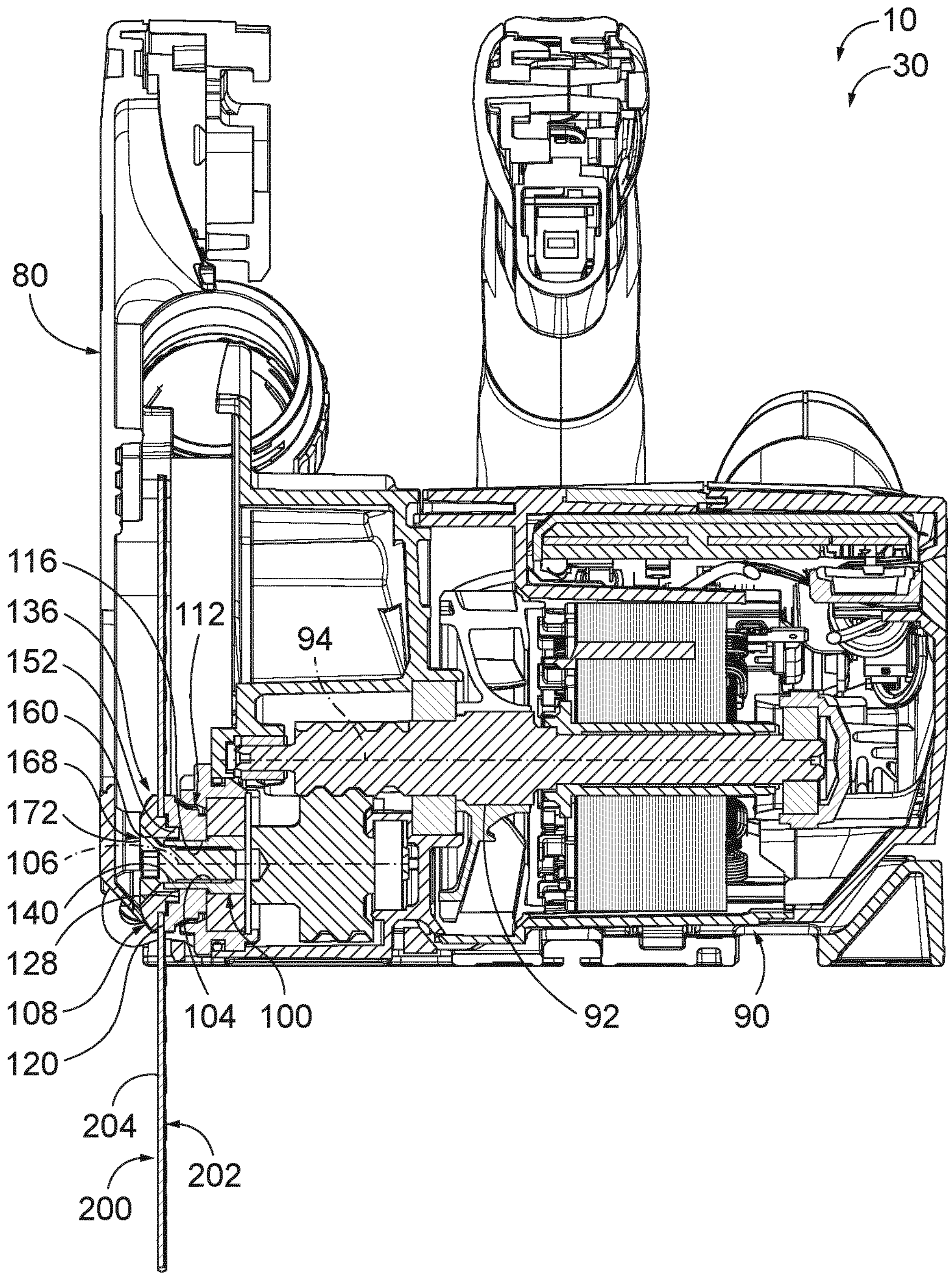
FIG. 13 is a cross-sectional view of the circular saw of FIG. 3 taken along line 13-13 of FIG. 3.
Figure 14:
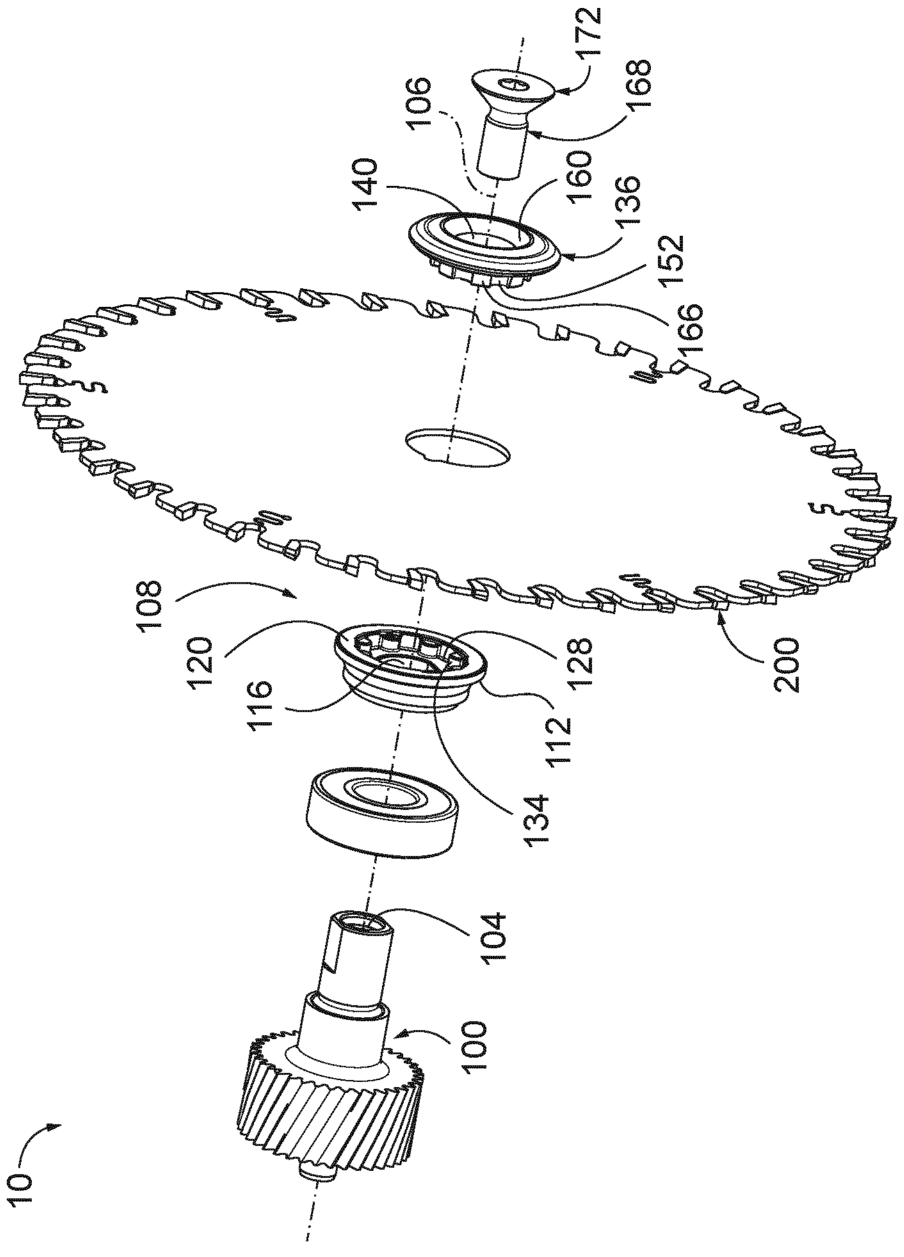
FIG. 14 is an exploded view of an arbor, blade mount, and circular saw blade, according to the present disclosure.
Figure 15:
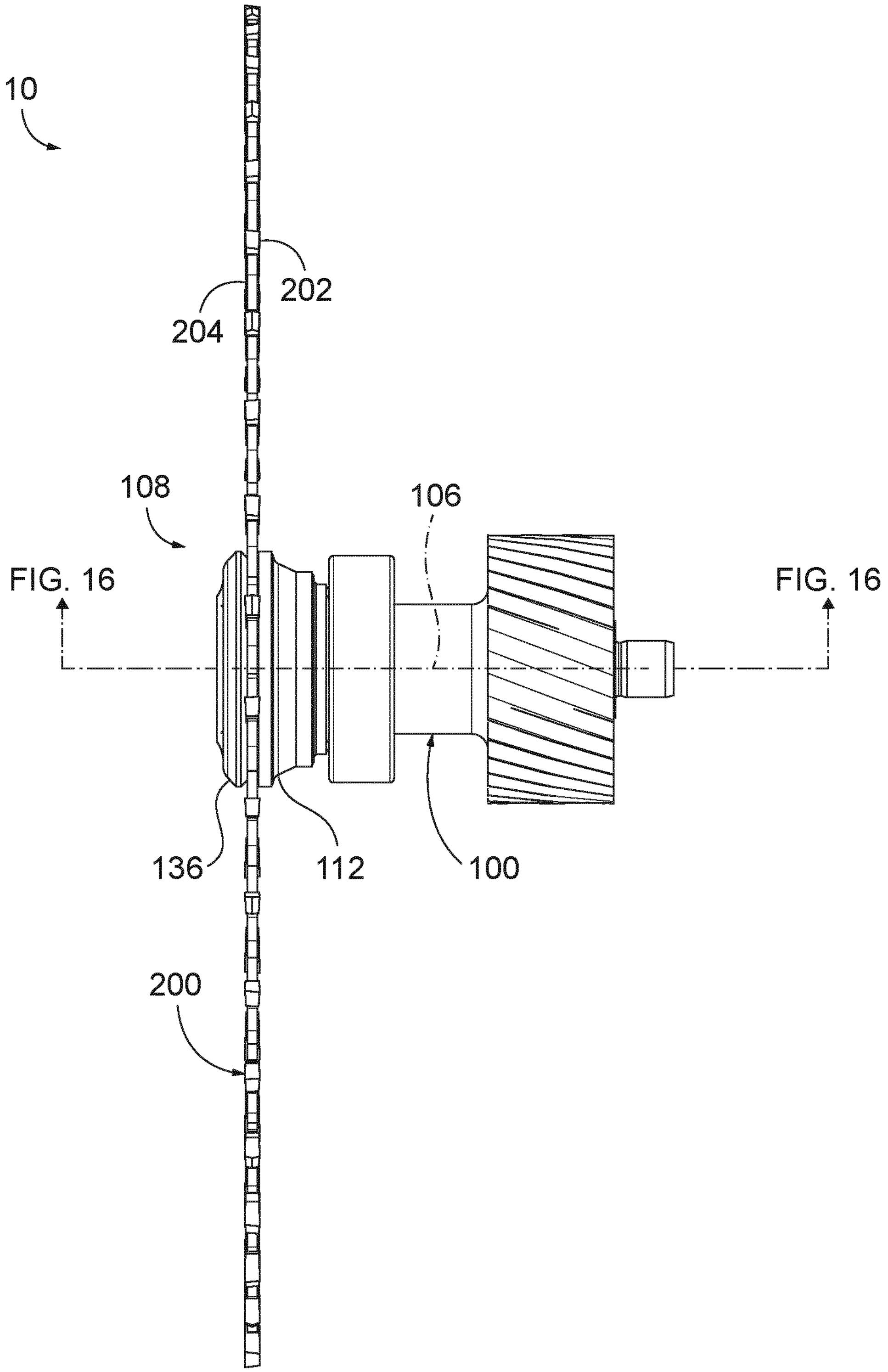
FIG. 15 is an assembled view of the arbor, blade mount, and circular saw blade of FIG. 14.
Figure 16:
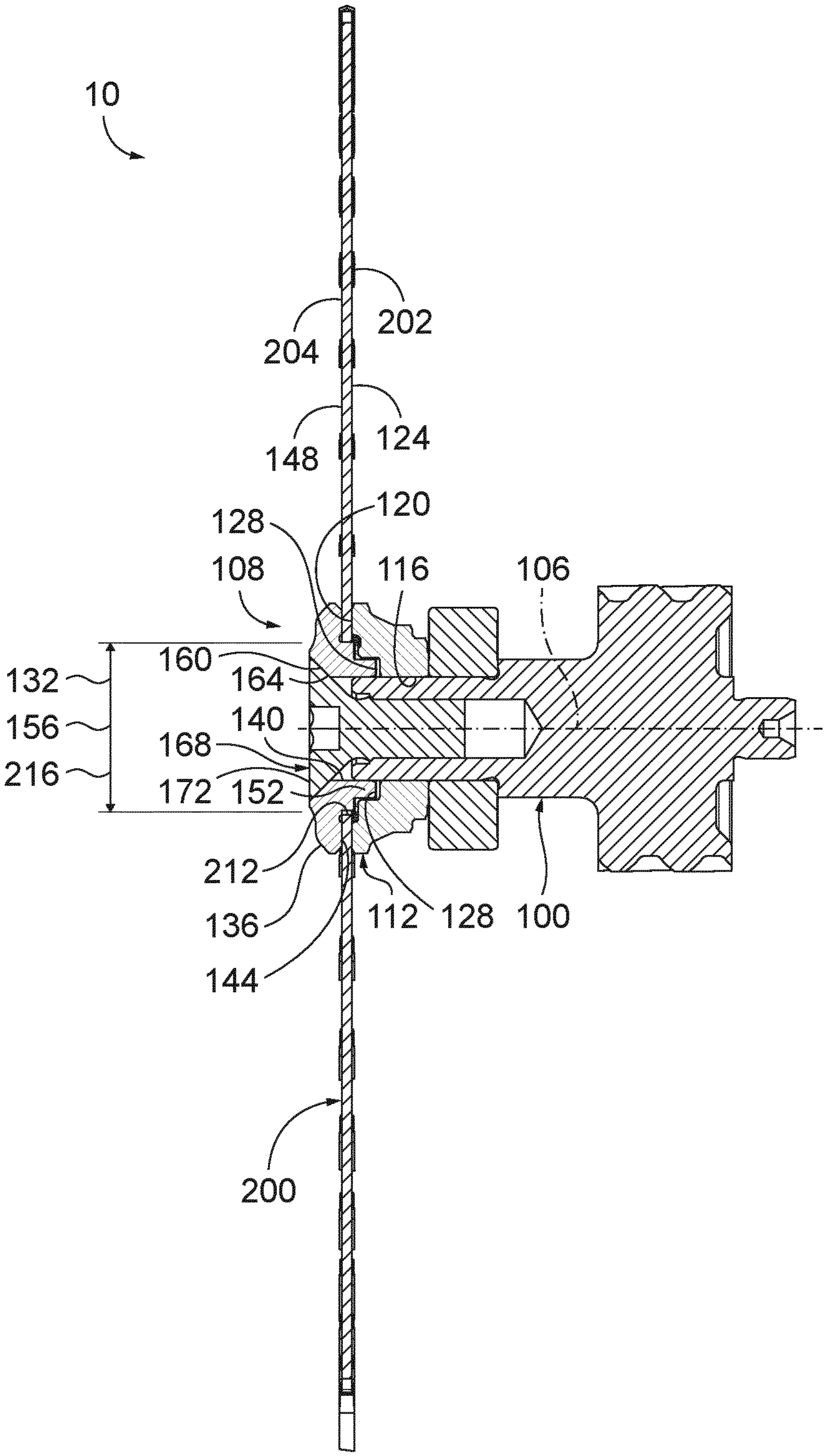
FIG. 16 is a cross-sectional view of the arbor, blade mount, and circular saw blade of FIG. 15 taken along line 16-16 of FIG. 15.

Circular saws 10, according to the present disclosure, also include a blade mount 108, which is operatively attached to arbor 100, and FIGS. 11-16 are illustrations of examples of components of a circular saw 10 that emphasize examples of arbor 100 operatively attached to blade mounts 108 and/or utilized to retain circular saw blades 200, according to the present disclosure. More specifically, FIG. 11 is a schematic illustration of examples of an arbor 100, a blade mount 108, and a circular saw blade 200 that may be utilized with circular saws 10, according to the present disclosure. FIG. 12 is a partially exploded profile view of an example of circular saws 10 and FIG. 13 is a cross-sectional view of circular saws 10 of FIG. 12 taken along line 13-13 of FIG. 3. FIG. 14 is an exploded view illustrating arbor 100, blade mount 108, and circular saw blade 200 of circular saw 10, FIG. 15 is an assembled view of the arbor, the blade mount, and the circular saw blade of FIG. 14, and FIG. 16 is a cross-sectional view of the arbor, the blade mount, and the circular saw blade of FIG. 14 taken along line 16-16 of FIG. 15.

Circular saws 10 of FIGS. 11-16 may include and/or be more detailed and/or different illustrations, views, and/or examples of circular saws 10 of FIGS. 1-10. As such, any of the structures, functions, and/or features disclosed herein with reference to circular saws 10 of FIGS. 11-16 may be included in and/or utilized with circular saws 10 of FIGS. 1-10 without departing from the scope of the present disclosure. Similarly, any of the structures, functions, and/or features disclosed herein with reference to circular saws 10 of FIGS. 1-10 may be included in and/or utilized with circular saws 10 of FIGS. 11-16 without departing from the scope of the present disclosure.

As collectively illustrated by FIGS. 1 and 11-17, arbor 100 and/or blade mount 108 may be configured to facilitate selective and repeated separation of circular saw blade 200 from a remainder of the circular saw and/or to facilitate selective and repeated attachment, or operative attachment, of the circular saw blade to the remainder of the circular saw. This may be accomplished in any suitable manner. As an example, arbor 100 may include and/or be a threaded arbor 104, and blade mounts 108 may include a fastener 168 that may thread into threaded arbor 104, as illustrated in FIGS. 1 and 11.

Arbor 100 may be configured to rotate, or to rotate circular saw blade 200, about an arbor rotational axis 106. Arbor rotational axis 106 may be parallel, or at least substantially parallel, to shaft axis of rotation 94 of motor shaft 92 of motor 90, as perhaps best illustrated in FIGS. 1 and 13 and as discussed in more detail herein.

As illustrated in FIGS. 1 and 11-16, circular saws 10 include blade mount 108. Blade mount 108 may be operatively attached to arbor 100, may be at least partially defined by arbor 100, and/or may be configured to operatively attach circular saw blade 200 to arbor 100. Blade mount 108 includes an inner flange 112 and may include an outer flange 136 and a fastener 168. Fastener 168 may be configured to threadingly engage with and/or within threaded arbor 104 and/or to selectively and/or operatively retain inner flange 112, outer flange 136, and/or circular saw blade 200 on arbor 100.

In some examples, and as illustrated, inner flange 112 may be operatively attached to arbor 100, such as by fastener 168. In some examples, inner flange 112 may be defined by and/or may form a portion of arbor 100.

As perhaps best illustrated in FIGS. 11-14, and 16, inner flange 112 may extend radially from, or away from, arbor 100 and/or arbor rotational axis 106. As perhaps best illustrated in FIGS. 11, 13-14 and 16, inner flange 112 may include and/or define a central inner flange opening 116, which may be configured to receive fastener 168 and/or to permit the fastener to pass therethrough. As also illustrated, inner flange 112 may be positioned proximate motor 90 relative to outer flange 136 when the blade mount is utilized to selectively and operatively attach the circular saw blade to the arbor.

As also perhaps best illustrated in FIGS. 11-14, and 16, inner flange 112 may include and/or define an inner flange blade-contacting surface 120, which may be configured to contact circular saw blade 200 when the circular saw blade is selectively and operatively attached to the circular saw via blade mount 108. Inner flange blade-contacting surface 120 may face away from motor 90, may face away from arbor 100, and/or may face away from a remainder of arbor 100. Inner flange blade-contacting surface 120 may be configured for at least partial, or even complete, face-to-face contact with a planar blade surface, such as an inner planar blade surface 202, of circular saw blade 200, as perhaps best illustrated in FIGS. 1, 11, 13, and 15-16.

Inner flange 112 also may include and/or define an inner flange recessed region 128. The inner flange recessed region also may be referred to herein as a recessed central region 128 of the inner flange.

As discussed in more detail herein, inner flange recessed region 128 may be sized and/or shaped to accept and/or to interlock with an outer flange projecting region 152 of outer flange 136. Inner flange recessed region 128 may have and/or define a maximum inner flange recessed region dimension 132, which may be measured in and/or within an inner flange plane 124 that may be defined by, may be parallel to, and/or may be coextensive with inner flange blade-contacting surface 120, as perhaps best illustrated in FIGS. 11 and 16. Maximum inner flange recessed region dimension 132 may correspond to a maximum central opening dimension 216 of a central opening 212 of circular saw blade 200. As an example, maximum inner flange recessed region dimension 132 may be equal to maximum central opening dimension 216 and/or may be within a threshold dimension tolerance of maximum central opening dimension 216. The threshold dimension tolerance may be selected to provide a sliding fit between inner flange recessed region 128 and outer flange projecting region 152 and/or between central opening 212 and the outer flange projecting region 152. Such a configuration may permit outer flange projecting region 152 to extend through central opening 212 of circular saw blade 200 and into inner flange recessed region 128 of inner flange 112.

Inner flange 112 may be free from any structure that projects away from a remainder of the inner flange, or away from motor 90, and that also projects away from inner flange blade-contacting surface 120. Additionally or alternatively, an entirety of inner flange 112 may be external central opening 212 of circular saw blade 200 and/or may not extend into the central opening when blade mount 108 selectively and operatively attaches the circular saw blade to the arbor. Stated another way, an entirety of inner flange 112 may be proximate arbor 100 relative to inner flange plane 124 and/or may be proximate motor 90 relative to the inner flange plane.

As perhaps best illustrated in FIG. 13, such a configuration may decrease a clearance, or a space, within blade guard 80, that is needed to permit and/or facilitate separation of circular saw blade 200 from a remainder of the circular saw and/or attachment of the circular saw blade to the remainder of the circular saw. Stated another way, blade mount 108 may be configured to permit and/or facilitate removal of the circular saw blade from the circular saw and/or attachment of the circular saw blade to the circular saw without a need to move the circular saw blade in a direction that is parallel to arbor rotational axis 106 and/or while only requiring motion of the circular saw blade in a direction 201 that is perpendicular, or at least substantially perpendicular, to the arbor rotational axis. Blade mount 108 thus may be configured to permit removal and replacement of circular saw blade 200 via only radial movement 201 of the circular saw blade relative to the inner flange, as opposed to conventional blade mounts that require both radial and translational movement of the circular saw blade.

As perhaps best illustrated in FIGS. 11, 13-14, and 16, outer flange 136 may extend radially from, or away from, arbor 100 and/or arbor rotational axis 106. As perhaps best illustrated in FIGS. 11, 13-14, and 16, outer flange 136 may include and/or define a central outer flange opening 140, which may be configured to receive fastener 168 and/or to permit the fastener to pass therethrough. As also illustrated, outer flange 136 may be positioned distal motor 90 relative to inner flange 112 when the blade mount is utilized to selectively and operatively attach the circular saw blade to the arbor.

Outer flange 136 may include and/or define an outer flange recessed region 160, which may be shaped, sized, and/or configured to receive a fastener head 172 of fastener 168. As perhaps best illustrated in FIGS. 11 and 16, outer flange recessed region 160 may include an outer flange shoulder 164, which may be sized to permit fastener 168 to extend at least partially through central outer flange opening 140 but to restrict fastener head 172 from extending through the central outer flange opening. Such a configuration may permit fastener head 172 to compress circular saw blade 200 between inner flange 112 and outer flange 136 when fastener 168 is threaded onto arbor 100.

Outer flange 136 may have and/or define an outer flange blade-contacting surface 144, as perhaps best illustrated in FIG. 16. Outer flange blade-contacting surface 144 may be configured to contact circular saw blade 200, may be configured for at least partial face-to-face contact with the circular saw blade, and/or may be configured for complete face-to-face contact with the circular saw blade and/or with an outer planar blade surface 204 of the circular saw blade when the circular saw blade is selectively and operatively attached to the circular saw. Outer flange blade-contacting surface 144 and outer flange recessed region 160 may be on opposed, or opposite, sides of outer flange 136. Outer flange blade-contacting surface 144 may face toward inner flange blade-contacting surface 120, may face toward arbor 100, and/or may face toward motor 90 when blade mount 108 selectively and operatively attaches the circular saw blade to the arbor.

As illustrated in FIGS. 11, 13-14, and 16, outer flange 136 includes outer flange projecting region 152. Outer flange projecting region 152 projects from outer flange blade-contacting surface 144 and/or away from outer flange recessed region 160. As discussed, outer flange projecting region 152 may be sized to be received within central opening 212 of circular saw blade 200 and/or within inner flange recessed region 128 of inner flange 112. With this in mind, a maximum outer flange projecting region dimension 156 of outer flange projecting region 152 may correspond to maximum central opening dimension 216 of circular saw blade 200 and/or to maximum inner flange recessed region dimension 132 of inner flange 112, as illustrated in FIG. 11. As an example, outer flange projecting region 152 may be clearanced to fit with, may be sized for a sliding fit with, and/or may be within a sliding fit tolerance of maximum central opening dimension 216 and/or maximum inner flange recessed region dimension 132. Maximum outer flange projecting region dimension 156 may be measured within an outer flange plane 148 that may be defined by, may be parallel to, and/or may be coextensive with outer flange blade-contacting surface 144.

In some examples, and as illustrated in dashed lines in FIG. 11 and in solid lines in FIG. 14, inner flange 112 may include an inner flange interlock structure 134, and outer flange 136 may include an outer flange interlock structure 166. Inner flange interlock structure 134 and outer flange interlock structure 166 may be configured to operatively interlock with one another, such as to resist and/or to prevent rotation of outer flange 136 relative to inner flange 112 about arbor rotational axis 106. Stated another way, rotation of arbor 100 about arbor rotational axis 106, such as may be responsive to rotation of motor shaft 92 of motor 90, while circular saw blade 200 is utilized to cut a workpiece may cause a torque, which may urge outer flange 136 to turn and/or rotate relative to inner flange 112. Operative engagement between inner flange interlock structure 134 and outer flange interlock structure 166 may resist, or block, such relative motion. Examples of inner flange interlock structure 134 and/or of outer flange interlock structure 166 include any suitable non-circular region, non-cylindrical region, keyed region, key recess, and/or key.

Figure 17:
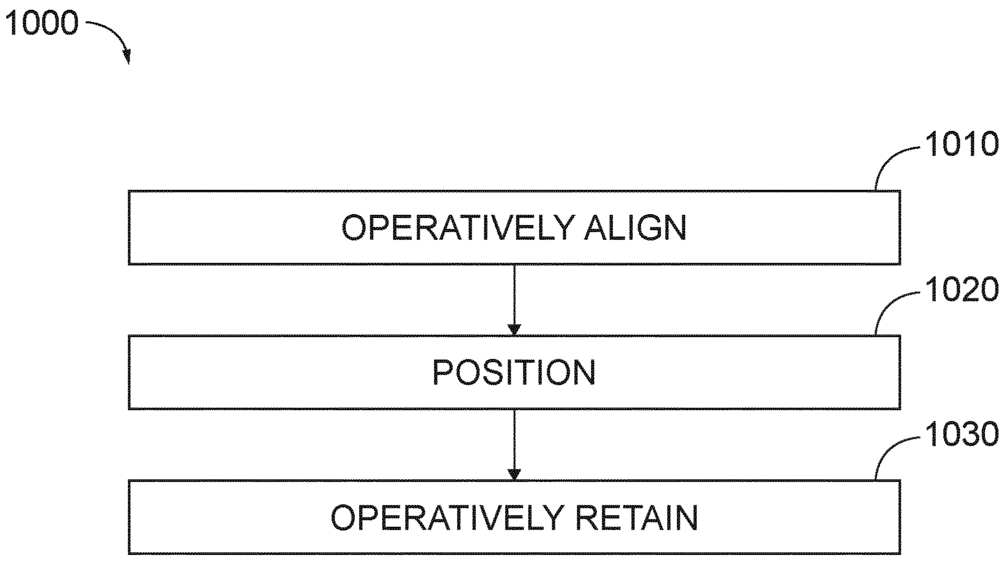
FIG. 17 is a flowchart illustrating examples of methods of selectively and operatively attaching a circular saw blade to an arbor of a circular saw, according to the present disclosure.

FIG. 17 is a flowchart illustrating examples of methods 1000 of selectively and operatively attaching a circular saw blade to an arbor of a circular saw, according to the present disclosure. As discussed in more detail herein with reference to FIGS. 1-16, the circular saws include a blade mount that is operatively attached to the arbor. The blade mount includes an inner flange that defines an inner flange blade-contacting surface. Examples of circular saws that may be utilized with methods 1000 are disclosed herein with reference to circular saws 10. Examples of the arbor are disclosed herein with reference to arbor 100. Examples of the blade mount are disclosed herein with reference to blade mounts 108. Examples of inner flange blade-contacting surfaces are disclosed herein with reference to inner flange blade-contacting surface 120. Methods 1000 include operatively aligning at 1010, positioning at 1020, and operatively retaining at 1030.

Operatively aligning at 1010 may include operatively aligning a central opening of the circular saw blade with the inner flange. This may include operatively aligning such that an inner planar blade surface of the circular saw blade is in face-to-face contact with the inner flange blade-contacting surface. Additionally or alternatively, the operatively aligning at 1010 may include operatively aligning such that the central opening of the circular saw blade is free from any structure that projects from the inner flange, such that the central opening is free from any structure that projects from the inner flange subsequent to the operatively aligning at 1010, such that no portion of the inner flange extends into the central opening, and/or such that, subsequent to the operatively aligning at 1010, the inner flange blade-contacting surface extends radially from the central opening. Examples of the central opening are disclosed herein with reference to central opening 212. Examples of the inner planar blade surface are disclosed herein with reference to inner planar blade surface 202.

In some examples, the operatively aligning at 1010 may include operatively translating one of the circular saw blade and the inner flange relative to the other of the circular saw blade and the inner flange. This may include operatively translating within, or in some examples at least substantially only within, an inner flange plane of the inner flange blade-contacting surface. Additionally or alternatively, the operatively translating at 1010 may include operatively translating in a radial direction, or only in a radial direction, relative to an arbor rotational axis of the arbor. Examples of the inner flange plane are disclosed herein with reference to inner flange plane 124. Examples of the arbor rotational axis are disclosed herein with reference to arbor rotational axis 106.

In some such examples, the inner planar blade surface is in face-to-face contact with the inner flange blade-contacting surface during at least a contact timeframe of the operatively translating. In some such examples, an entirety of the inner planar blade surface is in face-to-face contact with the inner flange blade-contacting surface during the contact timeframe and/or during at least a subset of the contact timeframe.

The contact timeframe may include and/or be any suitable timeframe, or duration of time, during the operatively aligning at 1010. In some examples, the contact timeframe may be prior to, or at least partially prior to, operatively aligning between the central opening and the inner flange. Stated another way, the absence of any structure that projects from the inner flange and into the central opening may permit and/or facilitate contact, face-to-face contact, and/or complete contact of the inner flange blade-contacting surface with the inner planar blade surface during relative motion between the circular saw blade and the central opening that is utilized to accomplish the operatively aligning at 1010.

Positioning at 1020 may include positioning an outer flange of the blade mount such that an outer flange blade-contacting surface of the outer flange is in face-to-face contact with an outer planar blade surface of the circular saw blade. Additionally or alternatively, the positioning at 1020 may include positioning such that an outer flange projecting region of the outer flange extends through the central opening of the circular saw blade and/or into an inner flange recessed region of the inner flange. Examples of the outer flange are disclosed herein with reference to outer flange 136. Examples of the outer flange blade-contacting surface are disclosed herein with reference to outer flange blade-contacting surface 144. Examples of the outer flange projecting region are disclosed herein with reference to outer flange projecting region 152. Examples of the inner flange recessed region are disclosed herein with reference to inner flange recessed region 128.

In some examples, and subsequent to the positioning at 1020, the outer flange blade-contacting surface may extend radially from the central opening of the circular saw blade. In some examples, and subsequent to the positioning at 1020, the outer flange may be positioned distal the motor relative to the inner flange and/or distal the arbor relative to the inner flange.

Operatively retaining at 1030 may include operatively retaining the outer flange on the arbor with a fastener. Examples of the fastener are disclosed herein with reference to fastener 168.

In some examples, the operatively retaining at 1030 may include compressing the circular saw blade between the inner flange and the outer flange. In some examples, the operatively retaining at 1030 may include threading the fastener into the inner flange and/or into the arbor. In some examples, the operatively retaining at 1030 further may include operatively retaining the inner flange on the arbor with the fastener.

In some examples, the operatively retaining at 1030 may include extending the fastener through a central inner flange opening of the inner flange and also through a central outer flange opening of the outer flange. Examples of the central inner flange opening are disclosed herein with reference to central inner flange opening 116. Examples of the central outer flange opening are disclosed herein with reference to central outer flange opening 140.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order and/or concurrently.

As used herein, the term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "comprising" may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

As used herein the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

Illustrative, non-exclusive examples of circular saws and methods according to the present disclosure are presented in the following enumerated paragraphs. It is within the scope of the present disclosure that an individual step of a method recited herein, including in the following enumerated paragraphs, may additionally or alternatively be referred to as a "step for" performing the recited action.

A0. A circular saw, comprising:

a motor including a motor shaft configured to rotate about a shaft rotational axis;

an arbor configured to receive a torque from the motor when the motor shaft rotates about the shaft rotational axis; and optionally a circular saw blade, optionally wherein the circular saw blade is operatively attached to the circular saw via the arbor for rotational movement with the arbor.

A0.1. The circular saw of paragraph A0, wherein the motor includes an electric motor.

A0.2. The circular saw of any of paragraphs A0-A0.1, wherein the circular saw further includes a gripping region configured to be gripped by a user of the circular saw during operation of the circular saw to cut a workpiece.

A0.3. The circular saw of any of paragraphs A0-A0.2, wherein the circular saw further includes a switch configured to selectively apply an electric current to at least one other component of the circular saw.

A0.4. The circular saw of any of paragraphs A0-A0.3, wherein the circular saw further includes a blade guard configured to prevent contact between a/the user and the saw blade.

A0.5. The circular saw of paragraph A0.4, wherein the blade guard includes a retractable region configured to retract when the circular saw is utilized to cut a/the workpiece.

A0.6. The circular saw of any of paragraphs A0-A0.5, wherein the circular saw further includes a workpiece support configured to position a workpiece and the circular saw relative to one another when the workpiece is cut by the circular saw.

A0.7. The circular saw of any of paragraphs A0-A0.6, wherein the circular saw further includes at least one of:
(i) a power cord configured to provide electric current to the circular saw; and
(ii) a battery configured to provide electric current to the circular saw.
A0.8. The circular saw of any of paragraphs A0-A0.7, wherein the circular saw is at least one of:
(i) a handheld circular saw;
(ii) a miter saw;
(iii) a radial arm saw;
(iv) a table saw;
(v) a chop saw;
(vi) a plunge saw;
(vii) a track saw;
(viii) a bevel saw;
(ix) an upcut saw; and
(x) a panel saw.
A0.9. The circular saw of any of paragraphs A0-A0.8, wherein the circular saw is a/the plunge saw.
A0.10. The circular saw of paragraph A0.9, wherein the plunge saw includes a base plate that defines an arbor-facing side and an arbor-opposed side.
A0.11. The circular saw of paragraph A0.10, wherein the arbor is operatively attached to the arbor-facing side of the base plate via a base plate pivot.
A0.12. The circular saw of paragraph A0.11, wherein the arbor and the base plate are configured to operatively rotate, relative to one another, about the base plate pivot to selectively vary a region of the circular saw blade that extends on the arbor-opposed side of the base plate.
A0.13. The circular saw of any of paragraphs A0-A0.12, wherein the circular saw is a/the track saw.
A0.14. The circular saw of paragraph A0.13, wherein the track saw includes a/the base plate that defines an/the arbor-facing side and an/the arbor-opposed side.
A0.15. The circular saw of paragraph A0.14, wherein the base plate further includes a rib-receiving channel configured to receive a raised elongate rib of a track.
A0.16. The circular saw of paragraph A0.15, wherein the track saw further includes the track, and wherein the track includes the raised elongate rib.
A1.1. The circular saw of any of paragraphs A0-A0.16, wherein the arbor is configured to facilitate selective and repeated separation of the circular saw blade from a remainder of the circular saw.
A1.2. The circular saw of any of paragraphs A0-A1.1, wherein the arbor is a threaded arbor.
A1.3. The circular saw of any of paragraphs A0-A1.2, wherein the circular saw further includes a blade mount that is operatively attached to the arbor, wherein the blade mount is configured to selectively and operatively attach the circular saw blade to the arbor.
A1.4. The circular saw of paragraph A1.3, wherein the blade mount includes at least one of an inner flange, an outer flange, and a fastener that selectively and operatively retains the outer flange on the arbor.
A1.5. The circular saw of paragraph A1.4, wherein the inner flange at least one of:
(i) is operatively attached to the arbor, optionally by the fastener; and
(ii) is defined by the arbor.
A1.6. The circular saw of any of paragraphs A1.4-A1.5, wherein the inner flange extends radially from the arbor.
A1.7. The circular saw of any of paragraphs A1.4-A1.6, wherein the inner flange includes a central inner flange opening configured to receive the fastener.
A1.8. The circular saw of paragraph A1.7, wherein the inner flange includes an inner flange blade-contacting surface that faces away from the motor and is configured to contact, or is configured for face-to-face contact with a planar blade surface of, the circular saw blade when the circular saw blade is selectively and operatively attached to the circular saw.
A1.9. The circular saw of paragraph A1.8, wherein the inner flange further includes an inner flange recessed region that extends into the inner flange from the inner flange blade-contacting surface.
A1.10. The circular saw of paragraph A1.9, wherein the inner flange recessed region is sized to receive an outer flange projecting region of the outer flange.
A1.11. The circular saw of any of paragraphs A1.9-A1.10, wherein the inner flange recessed region defines a maximum inner flange recessed region dimension, as measured within an inner plane defined by the inner flange blade-contacting surface, and further wherein the maximum inner flange recessed region dimension corresponds to a maximum central opening dimension of the circular saw blade.
A1.12. The circular saw of any of paragraphs A1.9-A1.11, wherein the inner flange is free from any structure that projects away from at least one of a remainder of the inner flange, the inner flange blade-contacting surface, and the motor.
A1.12.1. The circular saw of any of paragraphs A1.9-A1.12, wherein, when the blade mount selectively and operatively attaches the circular saw blade to the arbor, at least one of:
(i) an entirety of the inner flange is external a/the central inner flange opening of the circular saw blade; and
(ii) no portion of the inner flange extends into the central inner flange opening.
A1.12.2. The circular saw of any of paragraphs A1.9-A1.12.1, wherein the inner flange blade-contacting surface defines an inner flange plane, and further wherein an entirety of the inner flange is at least one of:
(i) proximate the arbor relative to the inner flange plane; and
(ii) proximate the motor relative to the inner flange plane.
A1.12.3. The circular saw of any of paragraphs A1.9-A1.12.2, wherein the inner flange includes an inner flange interlock structure, wherein the outer flange includes an outer flange interlock structure, and further wherein the inner flange interlock structure and the outer flange interlock structure are configured to operatively interlock with one another to resist rotation of the outer flange relative to the inner flange and about an arbor rotational axis of the arbor.
A1.13. The circular saw of any of paragraphs A1.4-A1.12, wherein the inner flange is positioned proximate the motor relative to the outer flange when the blade mount selectively and operatively attaches the circular saw blade to the arbor.
A1.14. The circular saw of any of paragraphs A1.4-A1.13, wherein the outer flange includes a central outer flange opening configured to receive the fastener.
A1.15. The circular saw of paragraph A1.14, wherein the outer flange includes an outer flange recessed region configured to receive a fastener head of the fastener.
A1.16. The circular saw of paragraph A1.15, wherein the outer flange recessed region includes an outer flange shoulder sized to permit the fastener to extend through the central outer flange opening and to restrict the fastener head from extending through the central outer flange opening.

A1.17. The circular saw of any of paragraphs A1.4-A1.16, wherein the outer flange includes an outer flange blade-contacting surface optionally configured to contact the circular saw blade when the circular saw blade is selectively and operatively attached to the circular saw.

A1.18. The circular saw of paragraph A1.17, wherein the outer flange blade-contacting surface and a/the outer flange recessed region are on opposed sides of the outer flange.

A1.19. The circular saw of any of paragraphs A1.17-A1.18, wherein the outer flange further includes an/the outer flange projecting region that projects from the outer flange blade-contacting surface.

A1.20. The circular saw of paragraph A1.19, wherein the outer flange projecting region is sized to be received within a/the inner flange recessed region of the inner flange.

A1.21. The circular saw of any of paragraphs A1.19-A1.20, wherein the outer flange projecting region defines a maximum outer flange projecting region dimension, as measured within an outer plane defined by the outer flange blade-contacting surface, and further wherein the maximum outer flange projecting region dimension corresponds to a/the maximum central opening dimension of the circular saw blade.

A1.22. The circular saw of any of paragraphs A1.4-A1.21, wherein the outer flange is positioned distal the motor relative to the inner flange when the blade mount selectively and operatively attaches the circular saw blade to the arbor.

B1. A method of selectively and operatively attaching a circular saw blade to an arbor of a circular saw, wherein the circular saw includes a blade mount, wherein the blade mount is operatively attached to the arbor and includes an inner flange that defines an inner flange blade-contacting surface, the method comprising:

operatively aligning a central opening of the circular saw blade with the inner flange such that an inner planar blade surface of the circular saw blade is in face-to-face contact with the inner flange blade-contacting surface and also such that the central opening of the circular saw blade is free from any structure that projects from the inner flange;

positioning an outer flange of the blade mount such that an outer flange blade-contacting surface of the outer flange is in face-to-face contact with an outer planar blade surface of the circular saw blade and also such that an outer flange projecting region of the outer flange extends through the central opening of the circular saw blade and into an inner flange recessed region of the inner flange; and operatively retaining the outer flange on the arbor with a fastener.

B2. The method of paragraph B1, wherein the operatively aligning includes operatively translating at least one of the circular saw blade and the inner flange, relative to the other of the blade and the inner flange, within an inner flange plane of the inner flange blade-contacting surface.

B3. The method of paragraph B2, wherein the inner planar blade surface is in face-to-face contact with the inner flange blade-contacting surface during at least a contact timeframe of the operatively translating.

B4. The method of paragraph B3, wherein an entirety of the inner planar blade surface is in face-to-face contact with the inner flange blade-contacting surface during the contact timeframe.

B5. The method of any of paragraphs B3-B4, wherein the contact timeframe is at least partially prior to operative alignment between the central opening and the inner flange.

B6. The method of any of paragraphs B1-B5, wherein, subsequent to the operatively aligning, the inner flange blade-contacting surface extends radially from the central opening of the circular saw blade.

B7. The method of any of paragraphs B1-B6, wherein the positioning includes positioning only via radial movement of the circular saw blade relative to the inner flange.

B8. The method of any of paragraphs B1-B7, wherein, subsequent to the positioning, the outer flange blade-contacting surface extends radially from the central opening of the circular saw blade.

B9. The method of any of paragraphs B1-B8, wherein, subsequent to the positioning, the outer flange is positioned distal a motor relative to the inner flange.

B10. The method of any of paragraphs B1-B9, wherein the operatively retaining includes compressing the circular saw blade between the inner flange and the outer flange.

B11. The method of any of paragraphs B1-B10, wherein the operatively retaining includes threading the fastener into at least one of the inner flange and the arbor.

B12. The method of any of paragraphs B1-B11, wherein the operatively retaining further includes operatively retaining the inner flange on the arbor with the fastener.

B13. The method of any of paragraphs B1-B12, wherein the operatively retaining includes extending the fastener through a central inner flange opening of the inner flange and also through a central outer flange opening of the outer flange.

B14. The method of any of paragraphs B1-B13, wherein the circular saw includes any suitable component of any of the circular saws of any of paragraphs A0-A1.22.

C1. The use of a blade mount that includes an inner flange that includes an inner flange blade-contacting surface and is free of any structure that projects away from a motor of a circular saw to operatively attach a circular saw blade to the circular saw.

C2. The use of any of the circular saws of any of paragraphs A0-A1.22 with any of the methods of any of paragraphs B1-B14.

C3. The use of any of the methods of any of paragraphs B1-B14 with any of the circular saws of any of paragraphs A0-A1.22.

INDUSTRIAL APPLICABILITY

The circular saws and methods disclosed herein are applicable to the power tool industry.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower, or equal in scope to the original claims, are also regarded as included within the subject matter of the inventions of the present disclosure.

The invention claimed is:

1. A circular saw, comprising:
- a motor including a motor shaft configured to rotate about a shaft rotational axis;
- an arbor configured to receive a torque from the motor when the motor shaft rotates about the shaft rotational axis, the arbor having an arbor rotational axis; and
- a blade mount that is operatively attached to the arbor, wherein the blade mount is configured to selectively and operatively attach a circular saw blade to the arbor, wherein the blade mount includes an inner flange, wherein the inner flange includes an inner flange blade-contacting surface that faces away from the motor and is configured to contact the circular saw blade when the circular saw blade is selectively and operatively attached to the circular saw, and further wherein both the arbor and the inner flange are free from any structure that projects away from the motor and also away from the inner flange blade-contacting surface such that the blade mount is configured to permit removal and replacement of the circular saw blade by movement of the circular saw blade relative to the inner flange only in a direction perpendicular to the arbor rotational axis;
- wherein the blade mount further includes an outer flange and a fastener that operatively retains the outer flange on the arbor;
- wherein the inner flange further includes an inner flange recessed region that extends into the inner flange from the inner flange blade-contacting surface, wherein the outer flange includes an outer flange blade-contacting surface and an outer flange projecting region that projects from the outer flange blade-contacting surface, wherein the inner flange recessed region is sized to receive the outer flange projecting region;
- wherein the inner flange recessed region includes an inner flange interlock structure;
- wherein the outer flange projecting region includes a larger diameter projecting portion projecting from the outer flange blade-contacting surface and a smaller diameter projecting portion projecting from the larger diameter projecting portion, the larger diameter projecting portion being configured to provide a sliding fit between a central opening of the circular saw blade and the larger diameter projecting portion, and the smaller diameter projecting portion including an outer flange interlock structure;
- wherein the inner flange interlock structure and the outer flange interlock structure directly engage one another to operatively interlock with one another to resist rotation of the outer flange relative to the inner flange and about the arbor rotational axis; and
- wherein the outer flange includes a central outer flange opening configured to receive the fastener and an outer flange recessed region configured to receive a fastener head of the fastener, and further wherein the outer flange recessed region includes an outer flange shoulder sized to permit the fastener to extend through the central outer flange opening and to restrict the fastener head from extending through the central outer flange opening.

2. The circular saw of claim 1, wherein the inner flange is positioned proximate the motor relative to the outer flange when the blade mount selectively and operatively attaches the circular saw blade to the arbor.

3. The circular saw of claim 1, wherein the inner flange further includes a central inner flange opening configured to receive the fastener.

4. The circular saw of claim 1, wherein the outer flange is positioned distal the motor relative to the inner flange when the blade mount selectively and operatively attaches the circular saw blade to the arbor.

5. The circular saw of claim 1, wherein when the blade mount selectively and operatively attaches the circular saw blade to the arbor, no portion of the inner flange extends into a central opening of the circular saw blade.

6. A circular saw, comprising:
- a motor including a motor shaft configured to rotate about a shaft rotational axis;
- an arbor configured to receive a torque from the motor when the motor shaft rotates about the shaft rotational axis, the arbor having an arbor rotational axis; and
- a blade mount that is operatively attached to the arbor, wherein the blade mount is configured to selectively and operatively attach a circular saw blade to the arbor, wherein the blade mount includes an inner flange, wherein the inner flange includes an inner flange blade-contacting surface that faces away from the motor and is configured to contact the circular saw blade when the circular saw blade is selectively and operatively attached to the circular saw, and further wherein both the arbor and the inner flange are free from any structure that projects away from the motor and also away from the inner flange blade-contacting surface such that the blade mount is configured to permit removal and replacement of the circular saw blade by movement of the circular saw blade relative to the inner flange only in a direction perpendicular to the arbor rotational axis;
- wherein the blade mount further includes an outer flange and a fastener that operatively retains the outer flange on the arbor;
- wherein the inner flange further includes an inner flange recessed region that extends into the inner flange from the inner flange blade-contacting surface, wherein the outer flange includes an outer flange blade-contacting surface and an outer flange projecting region that projects from the outer flange blade-contacting surface, wherein the inner flange recessed region is sized to receive the outer flange projecting region;
- wherein the inner flange recessed region includes an inner flange interlock structure;
- wherein the outer flange projecting region includes a larger diameter projecting portion projecting from the outer flange blade-contacting surface and a smaller diameter projecting portion projecting from the larger diameter projecting portion, the larger diameter projecting portion being configured to provide a sliding fit between a central opening of the circular saw blade and the larger diameter projecting portion, and the smaller diameter projecting portion including an outer flange interlock structure;

wherein the inner flange interlock structure and the outer flange interlock structure directly engage one another to operatively interlock with one another to resist rotation of the outer flange relative to the inner flange and about the arbor rotational axis;

wherein the outer flange includes a central outer flange opening configured to receive the fastener and an outer flange recessed region configured to receive a fastener head of the fastener, and further wherein the outer flange recessed region includes an outer flange shoulder sized to permit the fastener to extend through the central outer flange opening and to restrict the fastener head from extending through the central outer flange opening; and wherein the outer flange blade-contacting surface and the outer flange recessed region are on opposed sides of the outer flange.

* * * * *